(12) United States Patent
Garverick et al.

(10) Patent No.: US 6,705,165 B2
(45) Date of Patent: Mar. 16, 2004

(54) HIGH VOLTAGE DRIVE CIRCUITRY ALIGNED WITH MEMS ARRAY

(75) Inventors: Steven L. Garverick, Solon, OH (US); Michael L. Nagy, Lawrenceville, GA (US)

(73) Assignee: Movaz Networks, Inc., Norcross, GA (US)

( * ) Notice: Subject to any disclaimer, the term of this patent is extended or adjusted under 35 U.S.C. 154(b) by 0 days.

(21) Appl. No.: 10/348,252

(22) Filed: Jan. 21, 2003

(65) Prior Publication Data

US 2003/0140698 A1 Jul. 31, 2003

Related U.S. Application Data

(62) Division of application No. 09/884,676, filed on Jun. 19, 2001, now Pat. No. 6,543,286.
(60) Provisional application No. 60/267,285, filed on Feb. 7, 2001, and provisional application No. 60/264,267, filed on Jan. 26, 2001.

(51) Int. Cl.[7] .......................... G01P 15/00; G01P 15/125
(52) U.S. Cl. ................... 73/514.18; 73/514.32
(58) Field of Search .................. 73/514.18, 514.32, 73/514.36; 438/19, 106; 361/277

(56) References Cited

U.S. PATENT DOCUMENTS

| | | | | |
|---|---|---|---|---|
| 6,082,197 A | * | 7/2000 | Mizuno et al. | 73/514.36 |
| 6,242,989 B1 | * | 6/2001 | Barber et al. | 361/277 |
| 6,333,584 B1 | * | 12/2001 | Jerman et al. | 310/309 |
| 6,514,781 B2 | * | 2/2003 | Chang et al. | 438/19 |
| 6,558,976 B2 | * | 5/2003 | Shrauger | 438/106 |

* cited by examiner

Primary Examiner—Trong Phan
(74) Attorney, Agent, or Firm—Charles S. Guenzer

(57) ABSTRACT

Pulse-width modulation (PWM) control and drive circuitry particularly applicable to an array of electrostatic actuators formed in a micro electromechanical system (MEMS), such as used for optical switching. The high-voltage portion may be incorporated in an integrated circuit having drive cells vertically aligned with the MEMS elements. A control cell associated with each actuator includes a register selectively stored with a desired pulse width. A clocked counter distributes its outputs to all control cells. When the counter matches the register, a polarity signal corresponding to a drive clock is latched and controls the voltage applied to the electrostatic cell. The MEMS element may be a tiltable plate supported in its middle by a torsion beam. Complementary binary signals may drive two capacitors formed across the axis of the beam. The register and comparison logic for each cell may be formed by a content addressable memory.

17 Claims, 14 Drawing Sheets

HIGH VOLTAGE DRIVE CIRCUITRY ALIGNED WITH MEMS ARRAY

RELATED APPLICATIONS

This application is a division of Ser. No. 09/884,676, filed Jun. 19, 2001, now U.S. Pat. No. 6,543,286, issue fee paid, which claims benefit of U.S. Provisional Applications Nos. 60/264,267, filed Jan. 26, 2001, and 60/267,285, filed Feb. 7, 2001.

FIELD OF THE INVENTION

The invention relates to electrical driving circuits. In particular, the invention relates to electrical driving circuits configured to drive an array of electrostatic actuators, for example, micro electromechanical systems used for optical switches.

BACKGROUND ART

The technology of micro electromechanical systems (MEMS) originates from technology developed over decades in the fabrication of silicon integrated circuits. MEMS permits the fabrication of large arrays of microactuators that can serve as mirrors, valves, pumps, etc. for a variety of applications. Although the invention is not so limited, an important application is an array of tiltable mirrors integrated in a single substrate and used for switching of a large number of optical beams. Each mirror is part of a separately controlled actuator. These actuators are typically electrostatic in nature and require actuation voltages near 100V to operate.

An example of one cell of an electrostatically controlled MEMS array is illustrated in plan view in FIG. 1 and in cross-sectional view in FIG. 2. The cell is one of many such cells arranged typically in a two-dimensional array in a bonded structure including multiple levels of silicon and oxide layers. The cell includes a gimbal structure of an outer frame 110 twistably supported in a support structure 112 of the MEMS array through a first pair of torsion beams 114 extending along and twisting about a minor axis. The cell further includes a mirror plate 116 having a reflective surface 117 twistably supported on the outer frame 110 through a second pair of torsion beams 118 arranged along a major axis perpendicular to the minor axis and twisting thereabout. In the favored MEMS fabrication technique, the illustrated structure is integrally formed in an epitaxial (epi) layer of crystalline silicon. The process has been disclosed in U.S. Provisional Application, Ser. No. 60/260,749, filed Jan. 10, 2001, incorporated herein by reference in its entirety.

The structure is controllably tilted in two independent dimensions by a pair of electrodes 120 under the mirror plate 116 and another pair of electrodes 122 under the frame 110. The electrodes 120, 122 are symmetrically disposed as pairs across the axes of their respective torsion beams 118, 114. A pair of voltage signals $V_A$, $V_B$ are applied to the two mirror electrodes 120, and another pair of voltage signals are applied to the frame electrodes 122 while a common node voltage signal $V_C$ is applied to both the mirror plate 116 and the frame 110. The driving circuitry for these and similar voltage signals is the central focus of this invention.

Horizontally extending air gaps 124, 126 are formed respectively between the frame 110 and the support structure 112 and between the mirror plate 116 and the frame 110 and overlie a cavity or vertical gap 128 formed beneath the frame 110 and mirror plate 116 so that the two parts can rotate. The support structure 112, the frame 110, and the mirror plate 116 are driven by the common node voltage $V_c$, and the frame 110 and mirror plate 116 form one set of plates for variable gap capacitors. Although FIG. 2 illustrates the common node voltage $V_c$ being connected to the mirror plate 116, in practice the electrical contact is made in the support structure 112 and electrical leads are formed on top of the torsion beams 114, 118 to apply the common node voltage signal to both the frame 110 and the mist plate 116, which act as top electrodes. The electrodes 120, 122 are formed at the bottom of the cavity 128 so the cavity forms the gap of the four capacitors, two between the bottom electrodes 118 and the frame 110, and two between the bottom electrode 120 and mirror plate 116.

The torsion beams 114, 118 act as twist springs attempting to restore the outer frame 110 and the mirror plate 116 to neutral tilt positions. Any voltage applied across opposed electrodes exerts a positive force acting to overcome the torsion beams 114, 118 and to close the variable gap between the electrodes. The force is approximately linearly proportional to the magnitude of the applied voltage, but non-linearities exist for large deflections. If an AC drive signal is applied well above the resonant frequency of the mechanical elements, the force is approximately linearly proportional to the root mean square (RMS) value of the AC signal. In practice, the precise voltages needed to achieve a particular tilt are experimentally determined.

Because the capacitors in the illustrated configuration are paired across the respective torsion beams 114, 118, the amount of tilt is determined by the difference of the RMS voltages applied to the two capacitors of the pair. The tilt can be controlled in either direction depending upon the sign of the difference between the two RMS voltages.

As shown in FIG. 2, the device has a large lower substrate region 130 and a thin upper MEMS region 132, separated by a thin insulating oxide layer 134 but bonded together in a unitary structure. The tilting actuators are etched into the upper region, each actuator suspended over the cavity 128 by several tethers. The electrodes are patterned patterned onto the substrate, which can be an application specific integrated circuit (ASIC), a ceramic plate, a printed wiring board, or some other substrate with conductors patterned on its surface. The actuators in the upper region form a single electrical node called the "common node". Each actuator is suspended above four electrodes, each electrode being isolated from every other electrode. To cause the actuator to tilt in a specific direction, an electrostatic force is applied between the actuator and one or more of its electrodes by imposing a potential difference between the common node and the desired electrode. Each actuator has two pairs of complementary electrodes, one causing tilt along the major axis and the other causing tilt along the minor axis. Fabrication details are supplied in the aforementioned Provisional Application 60/260,749.

One drawback of electrostatic actuation used for this micromirror is a phenomenon known as "snapdown". Because electrostatic force is inversely proportional to the distance between the electrodes, there comes an angle at which the attractive force increases very rapidly with greater electrode proximity. Beyond this angle, a small decrease in distance leads to an enormous increase in force, and the electronic control loop becomes unstable, causing the electrodes to snap together. With such an actuator in which the electrodes comprise a flat plate suspended over a cavity by small tethers, a rule of thumb states that the plate will begin to snap down at a deflection corresponding to approximately four ninths the depth of the cavity. Hence, in order to achieve a deflection of θ at the end of the cantilever, the cavity must be approximately 2.25 θ deep. Electrostatic MEMS mirror arrays have been used as video display drivers, but they operated at two voltage levels, zero and full snap-down. In contrast, the mirrors described above must be nearly continuously tiltable over a significant angular range.

Optical constraints determine the deflection distance requirement for the electrostatic micromirror. The RMS voltage level required for a given amount of deflection results from a combination of actuator size, tether spring constant, and cavity depth. The cavity depth required to avoid snapdown generally dictates the use of relatively high voltages, typically in excess of 40V, the upper limit for many standard IC processes. The generation of such voltages requires an electronic system composed of high-voltage (HV) semiconductor components, either off-the-shelf or customized, which are fabricated by specialized HV processes, such as the HVCMOS process available from Supertex, Inc.

The application for which the invention was developed requires a 12×40 array of micromirrors, and the mirrors must be independently tiltable in both directions along two axes. Each tilt axis requires its own actuator pair so the driver array is 24×40. The size of the array is dictated by the switching of 40 wavelength-separated channels in a wavelength division multiplexing (WDM) optical network being switched between 6 input fibers and 6 output fibers with a folding mirror optically coupling paired input and output mirrors. Switching is accomplished by selective tilting about a major axis; and, power tuning by selective tilting about a minor axis. The MEMS structure accomplishes bi-directional tilt using two electrodes that are symmetrically placed about the central tether of each axis. Hence, there are four electrodes per microactuator, for a total of 3840 electrodes that must be independently controlled. Optical techniques such as "interleaving" may be used to split the array into two 12×40 chips, but even with this amelioration, each MEMS chip will have 1920 high-voltage inputs and outputs (I/Os). While I/O counts of several thousand are commonplace in certain low-voltage digital technologies such as memories. But, when the inputs here are high-voltage analog signals, as in the described mirror switching array, high I/O counts present a significant packaging problem.

Conventional methods for silicon chip I/O include wire bonding and die-to-substrate attachment known as "flip-chip". It is generally accepted that wire bonding becomes impractical at about 800 I/O's, due to the large chip perimeter required to contain the bond pads. Integrated circuits with higher I/O counts are typically attached to a substrate with solder bumping, and signals are routed to discrete drivers that are flip-chip bonded to the same substrate, but this solution becomes difficult in the intended application due to the very large number of high-voltage (HV) signals and the size of conventional HV circuitry.

MEMS actuators often exhibit a charging effect that builds up over time and, when the driving voltage is DC, eventually disables operation. Charging therefore dictates that the driving voltage has alternating polarity with zero DC bias. Also, MEMS microactuators may display significant operational variation from actuator to actuator or the operation may depend upon environmental conditions.

SUMMARY OF THE INVENTION

The invention includes the method and circuitry for driving an electrostatic or other type of actuator, particularly that used for a micro electromechanical system (MEMS). In an electrostatic actuator, a variable gap capacitor is formed between electrodes fixed on two mechanical elements, one of which is movable with respect to the other against a restoring force, such as a spring. The relative position of the two elements is controlled by pulse width modulation (PWM) in which the pulse width of a repetitive drive signal determines the RMS value of the applied voltage. The frequency of the drive signal is preferably at least ten times the mechanical resonant frequency of the mechanical elements.

Preferably, for electrostatic actuators, the drive signal is a bipolar signal having a zero DC component. Such a bipolar drive signal is achieved using digital circuitry by applying a first high-voltage signal synchronized to the drive frequency to one electrode and a second high-voltage signal to the other electrode at the same drive frequency but delayed from the first high-voltage signal.

The MEMS element may be a tiltable plate symmetrically formed about the axis of a torsion beam supporting it with two variable gap capacitors formed on opposing sides of the beam axis. Advantageously, a first binary high-voltage signal is applied to a first electrode spanning the beam axis, a delayed binary second high-voltage signal is applied to a second electrode opposed to one side of the first electrode, and a binary third high-voltage signal complementary to the second high-voltage signal is applied to third electrode opposed to the other side of the first electrode.

Alternatively, the delayed high-voltage signal is applied to a selected one of the paired capacitors while a high-voltage clock signal is applied to the unselected one.

The invention is advantageously applied to an array of MEMS actuators formed in top level of a bonded multi-level silicon structure. A control cell is associated with each actuator. Preferably, a high-voltage section, for example, having a power bus of 40 VDC or greater, of each control cell is positioned below the actuator it drives, and an array of such high-voltage sections are arranged on a same pitch as the actuators. The PWM control may be effected using a low-voltage logic section, for example, having a power bus of no more than 5 VDC. The high-voltage and low-voltage sections are distinguished by a ratio of power supply voltages of at least 8. The low-voltage section supplies a low-voltage version of the delayed drive signal, which the associated high-voltage section converts to a high-voltage drive signal. The low-voltage sections may be disposed below its corresponding actuator or may be disposed on a side of an array of actuators and corresponding high-voltage sections.

The control cell may be implemented as a counter driven by a master clock at a multiple of at least 8 of the drive clock to which the bipolar drive signal is locked and supplying its multi-bit output to many control cells. Each control cell includes a register for selectively storing a value corresponding to the desired delay. A multi-bit comparator compares the counter value with the register. When the two agree, a bipolar polarity signal oscillating at the drive frequency is latched until the corresponding time of the next half cycle. The latched signal is delayed from the drive frequency by the delay stored in the register. Data is stored in a selected one of the control cells by a multiplexing architecture including address decoders and a shared multi-bit data bus.

Such logic is advantageously implemented in a content addressable memory (CAM) having multiple CAM bits, each of which both stores a bit and compares it to the counter bit. When the two agree, its output is combined with that register's other CAM bit outputs in an AND circuit. This may be effected by precharging a single line that is discharged by any of the CAM bits connected to it. That single line enables a latch to latch the current value of the drive clock.

DETAILED DESCRIPTION OF THE PREFERRED EMBODIMENTS

Figure 3:
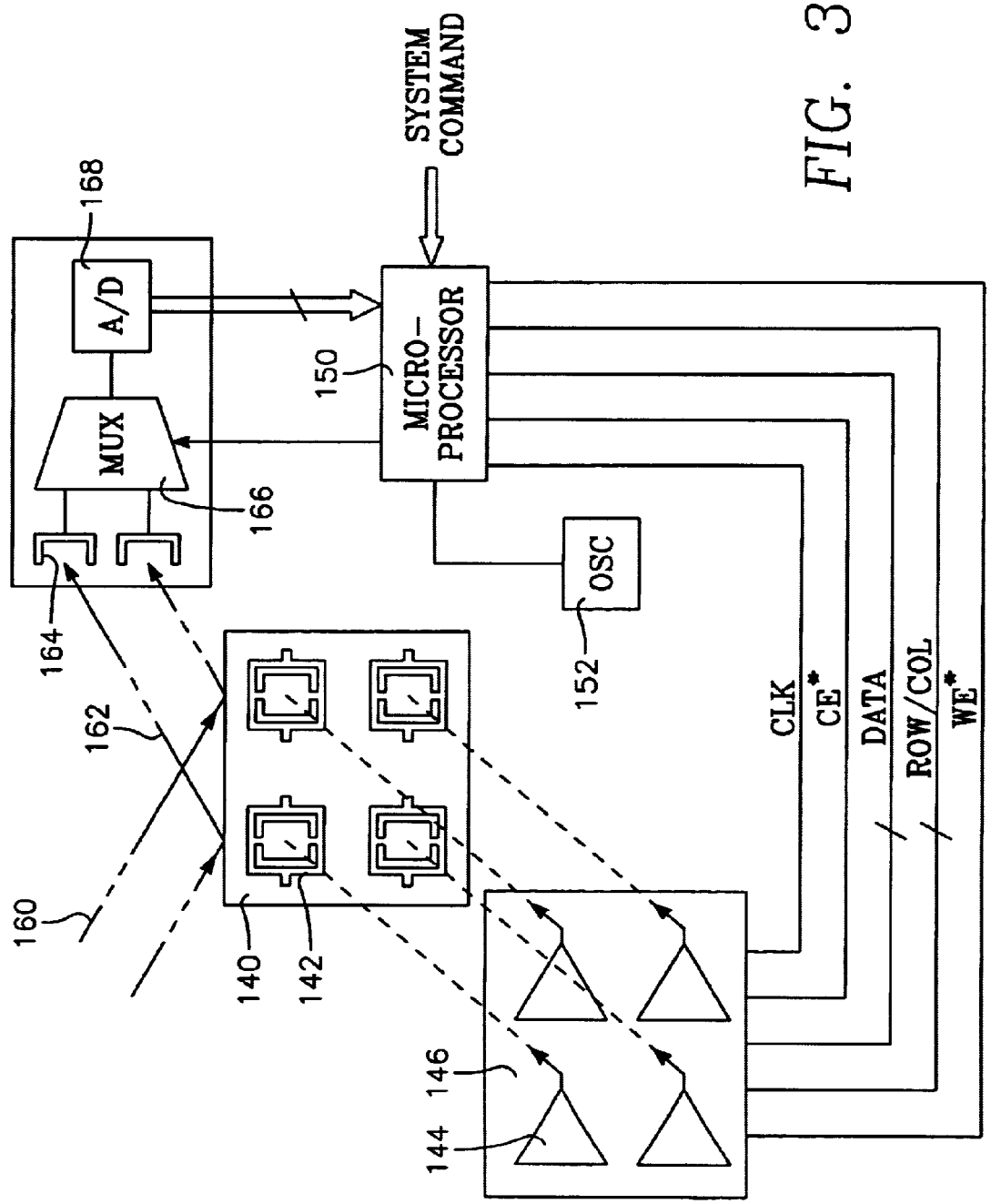
FIG. 3 is a schematic diagram of a control system architecture for an array of MEMS mirrors.

The drive circuitry of the invention is advantageously combined with other elements to form a micromirror switch array and control system illustrated schematically in FIG. 3. Although the invention most directly concerns the driver control circuitry and in particular its use of pulse width modulation, the invention is not limited to driving micromirrors. However, the mirror array as implemented in an optical switching system will be described first to provide specificity to the description of the control system. Further, some of the features of the micromirror array and its implementation in a bonded multi-level structure are advantageously combined with features of the control system.

A micromirror array 140 of FIG. 3 includes a number of tiltable mirrors 142 fabricated as a micro electromechanical systems (MEMS) by techniques originally developed in the semiconductor industry but now further developed for very small electrically controlled mechanical systems. The micromirror array 140 may be formed of a large number of cells illustrated in FIGS. 1 and 2 arranged on a regular pitch in two dimensions. The mirrors may have sizes of about 400 $\mu$m arranged on perpendicular pitches of about 650 $\mu$m and 1000 $\mu$m, allowing the entire 12×40 mirror array to be fabricated on a chip having dimensions of about 12 mm×26 mm. Each of the mirrors 142 includes two microactuators, each driven by a respective driver 144 in a driver integrated circuit 146. The driver 144 applies a high-voltage (HV) signal to electrodes forming variable gap capacitors with the tiltable mirror and effecting an electrostatic actuator (ESA). The figure indicates only a single drive for each mirror 142. However, the drive circuitry is easily extended to a two-axis tiltable mirror by including separate and independent drivers 144 for the two axes.

Advantageously, the driver integrated circuit 146 is fabricated on an application specific integrated circuit (ASIC) fabricated by a process which, if desired, can accommodate both the HV drivers 144 and lower-voltage control circuitry for the HV drivers. The driver integrated circuit can be interfaced directly to bottom of the micromirror array 140 by chip-on-chip solder bumping, frit bonding, or similar means leaving the top surface including the mirrors 142 exposed. At least the high-voltage drivers 144 are preferably positioned below the corresponding mirror microactuator 142 and are directly and vertically connected to the corresponding electrodes. As a result, the high-voltage drivers 144 need to be small enough to be arranged on the same pitch as the mirrors 142. Typically, the mirror chip 140 is smaller than the driver chip 146 with bonding pads and perhaps the lower-voltage circuitry in the driver chip 146 being exposed to the side of the mirror chip 146. Alternatively, the low-voltage circuitry is formed in one or more chips connected by bonding wires or solder bumps to the high-voltage ASIC in a multi-chip module (MCM) configuration. The single electrical connection to the common node forming the top electrodes of the electrostatic microactuators can be accomplished by eutectic bonding, polymer bonding, or wirebonding from the top side of the mirror chip 140.

Low-voltage control circuitry is readily available for DC power supplies of 5 VDC although lower voltages are becoming prevalent in digital integrated circuits. On the other hand, the electrostatic actuation of MEMS devices usable as optical switches require much higher voltages, generally a minimum of 20 VDC, but at least 40 VDC is preferred, and at least 100 VDC eases the overall design. Accordingly, when high-voltage circuitry is distinguished from low-voltage circuitry, the DC power buses of the two circuits supply voltages differ by at least a factor of four and preferably by a factor of eight.

The control system is a completely digital system based on a microprocessor 150 operating at a clock rate, approximately 25.6 MHz in the embodiment to be described later in detail, set by an oscillator 152. Other types of microcontrollers may also be utilized. Preferably, the microprocessor 150 and oscillator 152 together with the assembled ESA array 140 and driver integrated circuit 144 and perhaps a separate low-voltage control integrated circuit are mounted on a standard substrate carrier, typically formed of plastic or ceramic, with a small number of wire bonds connecting the microprocessor 150 and the periphery of the driver chip 146. The microprocessor 150 receives commands from the system controlling the optical switch and through multiplexing controls a large number of actuator cells through a small number of control lines. These commands include most importantly the desired positions of the mirrors 142, which effect switching between optical ports of the system. For the 12×40 mirror array discussed above, each mirror needs to be positionable in the major direction at, for example, six gross tilt angles as well as at finer angular resolution corresponding to tuning around those positions and in the minor direction in a fine resolution providing power tuning. As a result, two actuators are required for each mirror 142. It is understood that the invention can be applied to a different number of MEMS elements and is not limited to two-axis tilting.

The overall system also includes equalization of energies between the wavelength channels, as disclosed in U.S. Provisional Application 60/234,683, filed Sep. 22, 2000. The mirrors 142 redirect incident beams 160, only two of which are illustrated, into reflected beams 162 at angles determined by the mirror positions. The tilt of each mirror 142, as controlled by the drive voltages, is selected to redirect the incident beam 160 originating from a fixed angle to the reflected beam 162 at a selected output angle. The angle can be selected to correspond to different output ports or to tune the optical coupling to a particular output port, taking into account the unillustrated optics included within the system.

A small fraction of the power in each reflected beam 162 is detected in a respective optical detector 164. The larger fraction is coupled to unillustrated output ports of the switching system. A multiplexer 166 under control of the microprocessor 150 selects one of the detector outputs and an analog-to-digital (A/D) converter 168 digitizes the detected optical intensity and supplies it to the microprocessor 150. Thereby, microprocessor 150 monitors the optical intensity of the reflected beams. Thereby, the microprocessor 150 can instruct the tuning of the mirrors to either maximize the coupling or, more preferably, to equalize the intensity between multiple beams destined for the same WDM output fiber. Such equalization is important when the signals originate from different sources of uncertain power.

In one preferred implementation, separate input and output mirrors are coupled through an intermediate folding mirror. Each time an input optical signal is routed to a new output fiber, the microprocessor 150 reads the optimum position settings for both axes of both the input and output mirrors associated with this routing combination and sets the mirror positions accordingly. Optimum mirror settings may have changed since this routing combination was last used due to changes in environmental conditions, such as vibration, thermal expansion, fiber stress, etc. so the microprocessor 150 will then need to hunt for a new maximum in measured power by making small adjustments to the mirror settings, using, for example, a gradient descent algorithm, until the positions of peak intensity are determined.

Once the transmission coupling is optimized, the power of the output signals may be intentionally degraded to obtain equalization or other adjustment of power with the other output signals. Equalization may be achieved by reducing the angle on the minor axis until equalization is obtained following Newson's method in which the new minor-axis angle is estimated by computing the change in power necessary to obtain equalization divided by the angular derivative of power. This method is repeated until equalization is obtained. The derivative of the output power with minor-axis position must be learned by the microprocessor. Each time a mirror is adjusted to a new position, the angular derivative is computed using the measured change in power divided by the commanded change in angle.

Equalization is an ongoing process since environment conditions including laser power, may change. The microprocessor will routinely monitor all output power levels and, using its most recent knowledge of the power derivative, will adjust the minor-axis settings to maintain equalization. Likewise, it will make small adjustments to the major-axis settings to maintain optimum alignement despite changes in environmental conditions.

The microprocessor 150 controls a time multiplexed storage of position control in the actuator array ASIC 144. In the pulse width modulation control, the position control is dictated by a multi-bit duty cycle. The position data and a row and column address for which the data is to be applied are delivered to the actuator array 144 by the microprocessor 150. A write enable signal WE causes the addressed cell of the actuator array 144 to store the position data. Thereby, all cells are sequentially stored with position data, and the position data of any one cell can be updated as desired. A compare enable signal CE from microprocessor causes all of the cells in the actuator array to be simultaneously PWM controlled according to position data stored in the respective cell with a timing referenced to a clock signal CLK supplied from the microprocessor 150 as derived from an oscillator 152. In the described example, the electrostatic microactuators are subjected to a bipolar signal oscillating at 50 kHz and the CLK signal is 512 times greater, that is, 25.6 MHz.

Figure 1:
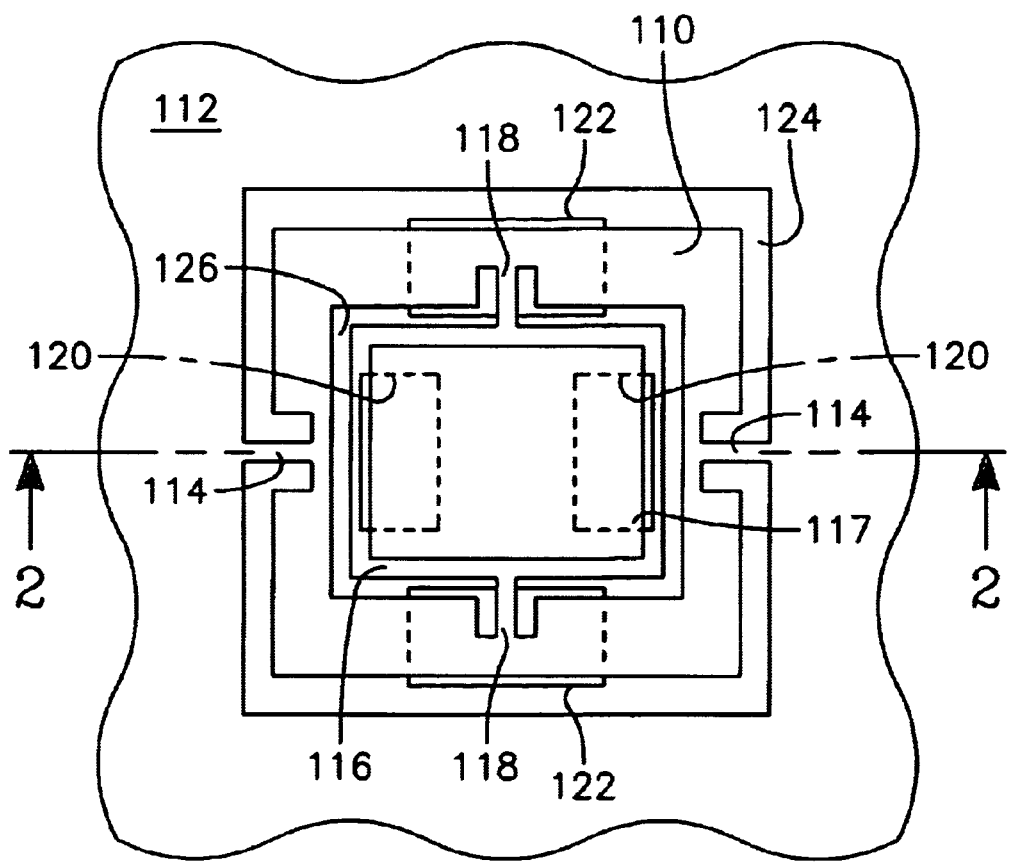
FIG. 1 is a plan view of a cell of an array of micro electromechanical actuators including a mirror tiltable in two perpendicular directions.
Figure 2:
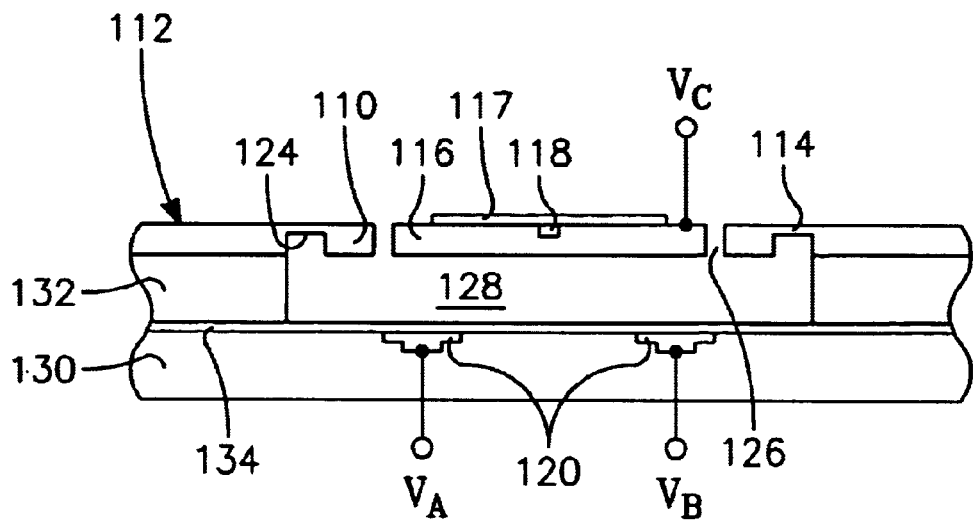
FIG. 2 is a cross-sectional view of the cell of FIG. 1 taken along view line 2—2.

This design is facilitated by drive circuitry having several characteristics. It should output RMS voltages as large as 200V with zero DC bias to obtain adequate electrostatic mirror deflection while avoiding charging effects. Any substantial deviation from zero DC bias will require occasionally discharging the electrostatic actuator on time periods inconvenient for operation. Any AC component in the drive signal should be at a frequency that is at least ten times greater than the mechanical resonance of the MEMS structure, which for the illustrated structure of FIGS. 1 and 2, is about 5 kHz, so that the mechanical inertia provides sufficient low-pass filtering of the drive current to prevent oscillation of the mirror. The RMS values of the output voltages controls the tilt positions of the mirrors, which need to be controlled not only between the output ports but also to fine tune the positions for variations between actuators and to account for temporal and environmental variations. A resolution of eight bits (one part in 256) is considered adequate in a switching system with optimized optics although 4 bits (1 part in 64) may be sufficient in other applications. The total area of the high-voltage driver cell should be no greater than of the actuator cell, approximately 650 μm×1000 μm so that devices such as high-voltage capacitors and field-effect transistors should be eliminated or at least their number minimized. It would be desirable to include the low-power circuitry in the same area, but the low-power circuitry can be placed to the side of the actuator array if necessary.

Figure 4:
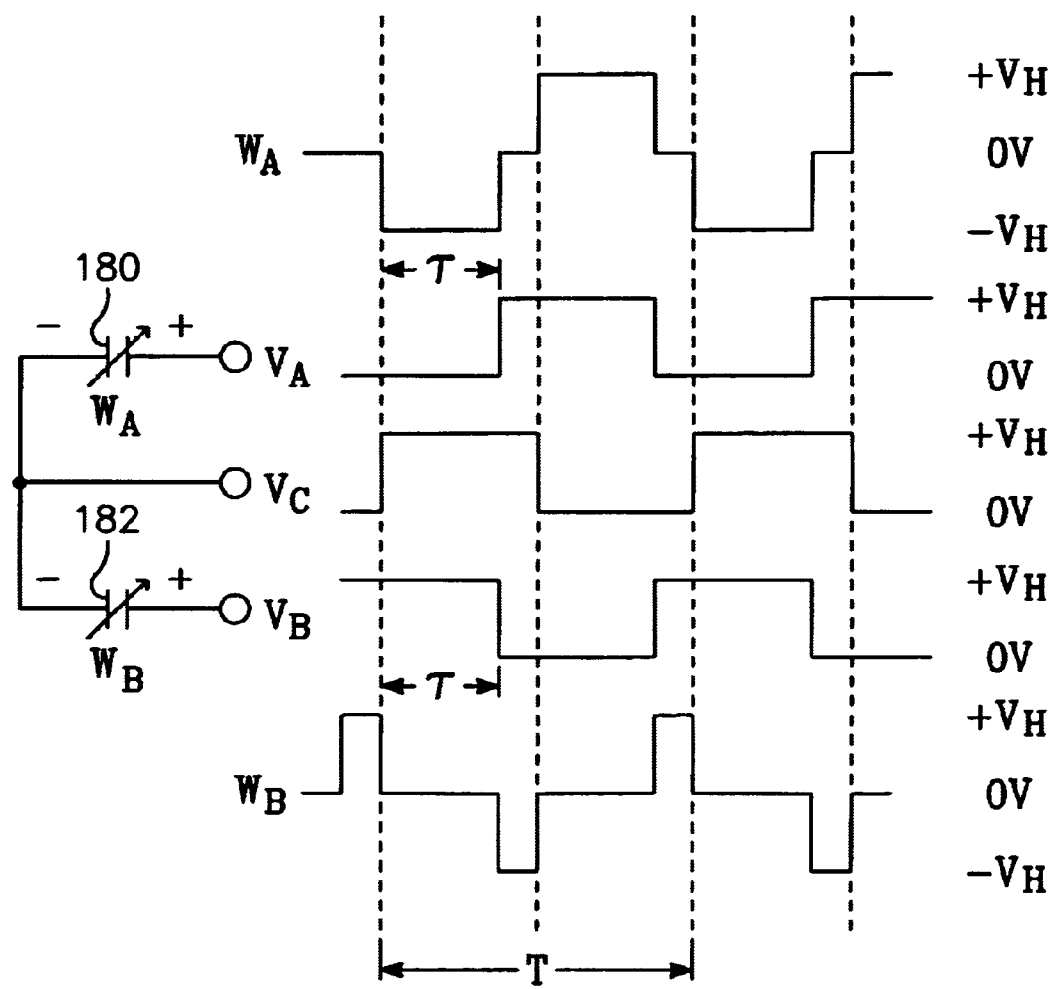
FIG. 4 is a timing diagram for pulse width modulated voltage driving signals combined with a schematic of the electrostatic actuator they are driving.

The drive circuitry described below achieves all of these objectives by a high-speed bipolar actuator signal having an RMS value controlled by pulse-width modulation (PWM). The general bipolar PWM timing diagram is illustrated in FIG. 4 for the differential control of an electrostatic actuator including two paired variable-gap capacitors 180, 182, as illustrated in FIGS. 1 and 2, formed between either the two electrodes 120 and the mirror plate 116 or the two electrodes 122 and the frame 110. The mirror plate 116 or frame 110, represented by one side of the two capacitors 180, 182, is drive by a common node signal $V_C$, which is a binary, unipolar square-wave signal of 50% duty cycle oscillating between ground and a high voltage $+V_H$ with a repetition period T, which is the inverse of the high-frequency $f_{DRIVE}$, which is at least ten times greater than the MEMS resonant frequency. In the projected design of the actuators for a 50 kHz drive signal, T is 20 μs. The two electrodes are respectively driven by two complementary electrode signals $V_A$, $V_B$ of the same waveform as the common node signal $V_C$ except that the first electrode signal is shifted in phase by a time τ, which is variable between 0 and T/2. Each of the signals $V_A$, $V_B$, $V_C$ is a square wave binary signal with 50% duty cycle having values of either 0 or $+V_H$, of equal duration although it is appreciated that the ground point can be offset from zero with proper consideration of other grounding points.

A voltage drive signal $W_A$, $W_B$ across the respective capacitor 180, 182 is the difference between the electrode signal $V_A$ or $V_B$ and the common node signal $V_C$. As illustrated, both drive signals $W_A$, $W_B$ are bipolar with a zero DC component, thereby avoiding charging of the electrostatic actuator. The voltage drive signals $W_A$, $W_B$ can alternatively be characterized as ternary with values of 0 and $\pm V_H$ with the finite components having equal duration. The switching of the common node signal $V_C$ allows a high-voltage power supply at $V_H$ to produce bipolar signals $W_A$, $W_B$ having respective voltage swings of $2 \cdot V_H$. The force applied across the respective capacitor is determined by the mean square (MS) voltage applied to that capacitor, which is directly proportional to the respective duty factor of the drive signals $W_A$, $W_B$, which is proportional to the time delay τ. If the duty factor of the first capacitor 180 is α, the duty factor of the second capacitor 182 is (1−α). As illustrated, the first capacitor 180 has a larger duty cycle than does the second 182. Therefore, a greater electrostatic force will be applied to the first capacitor 180 than to the second one 182, thereby causing the first capacitor 180 to contract and the second capacitor 182 to expand since both are balanced across the torsion beam. That is, the mirror is tilted toward the stationary electrode part of the first capacitor 180 and away from that of the second capacitor 182. The situation is reversed however for time delays τ of less than T/4. At a time delay τ=T/4, the mirror is balanced in a neutral position. Thereby, the mirror position (tilt) is controlled by the time delay τ thus providing pulse width modulation (PWM) control where the PWM control can be digitally effected by mostly low-power timing signals.

The described PWM control offers several advantages. The voltage seen across the electrodes is the difference between the square wave common node signal and its phase shifted counterparts. Thereby, a high-voltage power supply of $V_H$ produces voltage swings of $2 \cdot V_H$ and a bipolar signal having a maximum root mean square (RMS) value of $V_H$ and a zero DC component. The high-voltage common node signal $V_C$ may be supplied to all the common nodes of the array and may be supplied by a single off-chip driver, thus reducing the needed die size. Further, the applied RMS voltage, which determines the mirror position or tilt, varies linearly with the pulse width of the differential signal or the delay between the two digital drive signals. Such linearity may simplify the actuator control.

Figure 5:
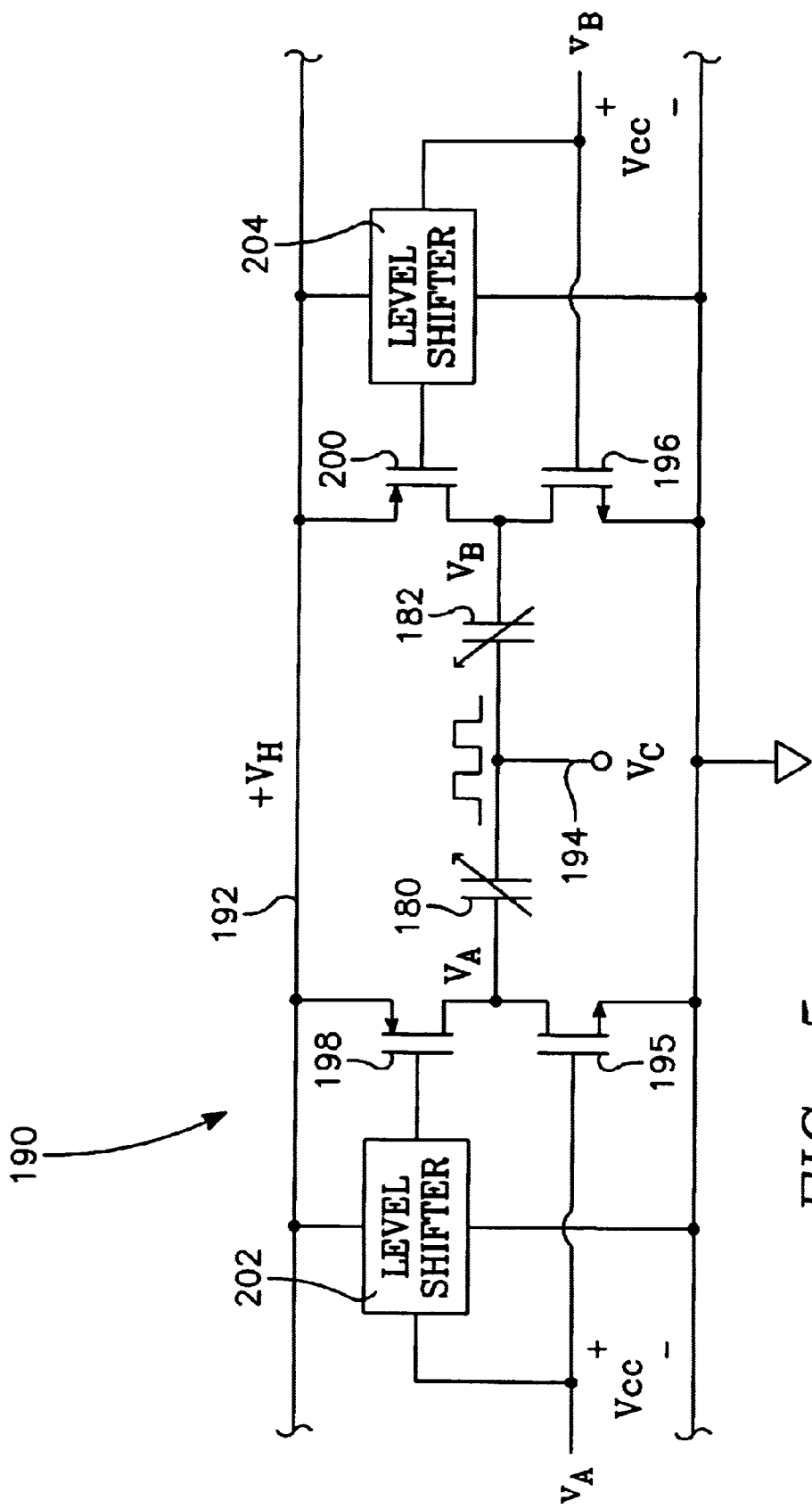
FIG. 5 is a circuit diagram for the high-voltage drive circuit which translates logic level pulse width modulation (PWM) signals to high-voltage signals.

PWM control is easily incorporated into the system architecture of FIG. 3 using a high-voltage driver cell 190 illustrated in FIG. 5. Preferably, the high-voltage driver cell 190 is positioned vertically under the cell of its associated electrostatic actuator in the bonded structure of FIG. 2. Two such driver cells 190 are needed for each mirror in the array if two-axis tilting is to be achieved. Besides ground, each cell 190 includes low-voltage (for example, 5V) complementary control signals $v_A$ and $v_B$ corresponding to $V_A$ and $V_B$ but at much lower voltage. These control signals may be provided on separate lines to this particular cell by control circuitry which may be located on the periphery of the drive chip. The cell 190 also includes a high-voltage power bus 192 at $+V_H$, for example, 40 VDC or higher, and the common node signal $V_C$ on common node 194. However, both the high-voltage power bus 192 and the common node 194 may be common to all cells in the array with the common node signal $V_C$ being generated by a single high-voltage drive located away from the mirror array, perhaps not even on the same chip. On the other hand, if desired, both the high-voltage and low-voltage circuitry may be fabricated on a single integrated circuit.

The electrodes 180, 182 are driven by CMOS push-pull drivers including NMOS transistors 195, 196 each having a drain connected to the electrode of the respective capacitor 180, 182, gates connected to low-voltage binary drive control signals $v_A$, $v_B$ and sources connected to ground. The push-pull drivers also include PMOS transistors 198, 200 each having a source connected to the high-voltage bus 192, a drain connected to the electrode of the respective capacitor 180, 182, and gates connected to respective level shifters 202, 204. The level shifters 202, 204 are connected between the high-voltage bus 192 and ground and are respectively controlled by the low-voltage control signals $v_A$, $v_B$. The level shifters 202, 204 are high-voltage circuits which shift the low-voltage control signals $v_A$, $v_B$ transitioning between 0 and $V_{CC}$ to high-voltage signals transitioning between $(+V_H - V_{CC})$ and $+V_H$, where $V_{CC}$ is preferably 5V or less. The low-voltage control signals $v_A$, $v_B$ are preferably complementary to each other so that only one of them needs be provided by the control circuitry is the high-voltage cell 190 includes an inverter. Alternatively, a single level shifter can be used that provides both true and complemented outputs. Such a dual-output level shifter may be driven by a single low-power control signal and provide gate signals to both PMOS transistors 198, 200. The push-pull drivers carry nearly zero quiescent current so power consumption is minimized, limited by the well known relationship for binary switches $CV^2 f_{DRIVE}$, where C is the load capacitance, V is the voltage, and $f_{DRIVE}$ is the switching frequency. Alternatively, the push-pull drive transistors may be complementary on the two sides allowing a single high-voltage signal and single low-voltage signal to complementarily drive them, but such a design requires more transistors.

The low-power control signals $v_A$, $v_B$ controlling the high-voltage circuitry of FIG. 5 are preferably generated by low-voltage CMOS logic preferably integrated on the same chip as the high-voltage circuitry, but optionally separate chips may be bonded to a common substrate and electrically coupled together by any of several packaging technologies, including bonding wires and solder bumps. The low-voltage logic demultiplexes drive commands from the microprocessor and ultimately the switch system controller. The low-voltage logic needs to be implemented efficiently to minimize die area, allowing matching of pitch with the actuator array. Ideally, each low-voltage logic cell would be integrated close to its associated high-voltage cell to thereby match pitch in two dimensions. Even if this is not possible, the logic area must be minimized to produce a reasonable total die area. One design to be described below puts the low-voltage logic on two opposed sides of chip area accommodating the high-voltage drivers. The logic area is small enough to allow pitch matching in one dimension but is substantially larger than the high-voltage drivers in the other dimension.

Figure 6:
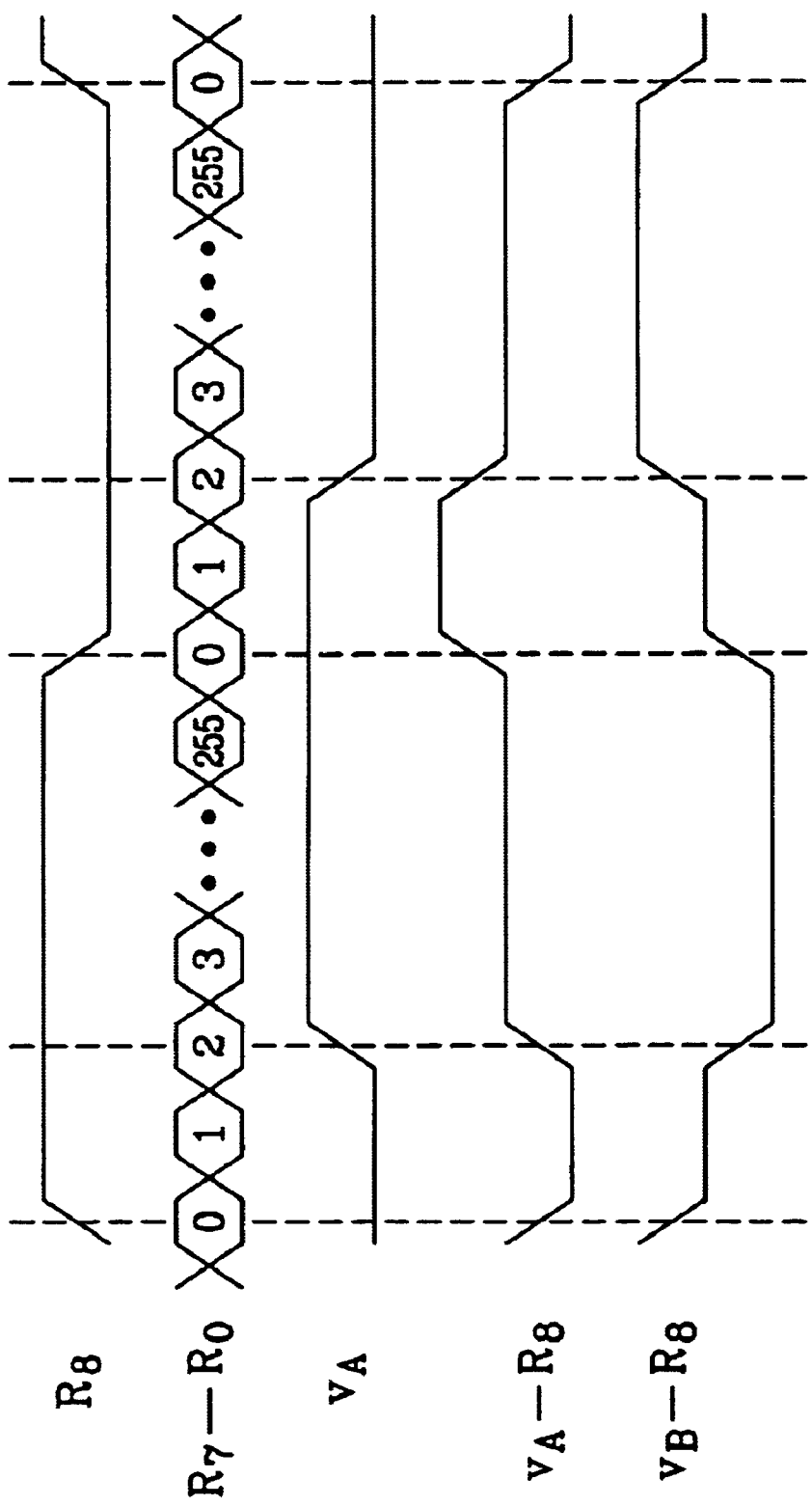
FIG. 6 is a timing diagram illustrating the generation of the PWM signal.
Figure 7:
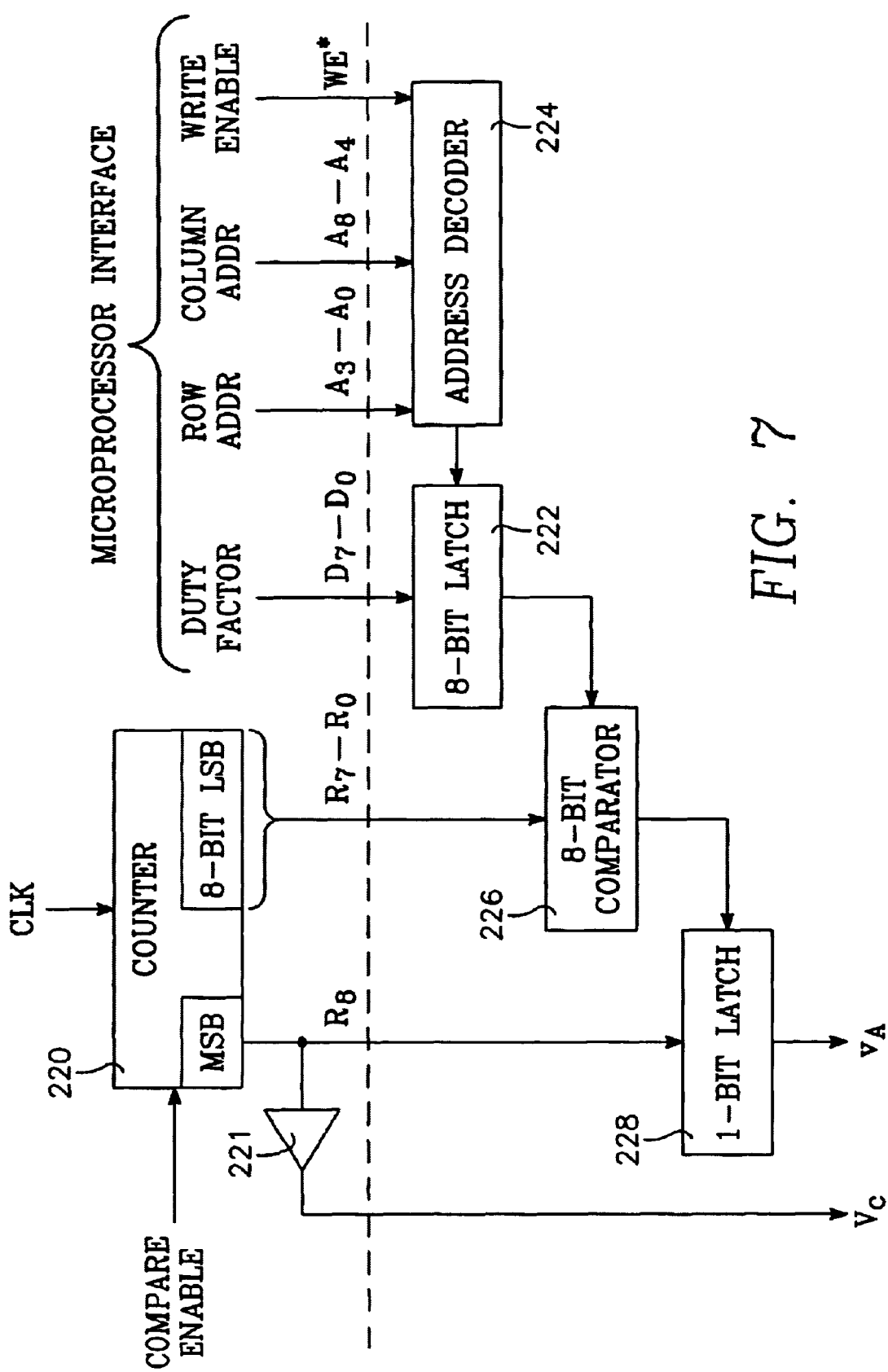
FIG. 7 is a block diagram of a logic driver circuit, which may be implemented in content addressable memory (CAM).

The control logic may be implemented in a number of ways, but an architecture, show in FIG. 7, based on content-addressable memory (CAM) has been found to be particularly advantageous in producing waveforms illustrated in FIG. 6. A 9-bit counter 220 is driven by a clock signal CLK at a frequency 512 times the drive frequency $f_{DRIVE}$, that is, at 25.6 MHz in the example design. The counter outputs $R_0$–$R_8$ are applied to all CAM cells to be described later. The most-significant bit $R_8$ is used as a polarity indicator in creating the bipolar drive signal. A high-voltage driver 221 level-shifts the most-significant bit $R_8$ to create the oscillating binary common node signal $V_C$ that is commonly supplied to all actuators or some plurality of them, for instance, those in a quadrant of the array to be described later. Thus, $R_8$ and $V_C$ are synchronized. The high-voltage amplifer 221 may be implemented with a structure similar to the push-pull transistors 195, 198 and level shifter 202 of FIG. 5.

The other, lower-order counter bits $R_0$–$R_7$ repetitively cycle between 0 and 255 with the most significant bit $R_8$ toggling at the end of each cycle at the rate of the drive clock cycle CLK. Each CAM cell is stored with a binary code so that at one of these values ($R_7 \ldots R_0$), the cell latches the control signal $v_A$ to the current value of the most-significant bit $R_8$. Because the high-voltage circuitry of FIG. 5 differences level-shifted versions of $v_A$ and $R_8$, an effective differential drive signal $v_A$–$R_8$ is a bipolar signal having a duty cycle of α, which for the illustrated stored value of 1 is 2/256 or about 1%. The drive signal $v_B$ is complementary to $v_A$ so the other effective differential drive signal $v_B$–$R_8$ has the indicated form with a duty cycle of 1–α or for the same stored value about 99%. The duty cycles linearly correspond to the mean square voltages applied to the respective electrodes.

The logic implemented by the CAM circuitry can be understood with reference to the block diagram of FIG. 7. A 9-bit reference counter 220 is clocked by a square wave clock signal, for example at 25.6 MHz, which for the rest of the circuit is a complemented compare enable CE*. Only one counter 220 is needed for the array, but if the array is physical separated into subarray, these can be driven independently by independent counters. The rest of the circuitry for the most part needs to be replicated for each logic cell, that is, one for each microactuator. However, some high order address decoding may be shared.

Each logic cell is connected to the microprocessor 150 by a number of lines shared in common by all the logic cells. An 8-bit latch 222 receives four data lines $D_7$–$D_0$ from the microprocessor that carry the 8-bit duty cycle intended for that cell. A programmed address decoder 224 receives four bits $A_3$–$A_0$ of row address and five bits $A_8$–$A_4$ of column address. The address decoder 224 is permanently programmed with a unique 9-bit address The address decoder 224 receives a complemented write enable signal WE*. When WE* goes true, the decoder 224 compares its stored address with the address on the address lines $A_8$–$A_0$. If the two agree, the address decoder 222 outputs a latch signal to the 8-bit latch 222 to latch the duty factor value currently on the data lines $D_7$–$D_0$. The operations described to this point are performed in an operation to initialize or to update position information for a particular actuator cell. Once the duty cycle data is latched, that value is used for that cell until the locally stored data is updated.

An 8-bit comparator 226 receives the 8 bits of latched duty cycle data from the 8-bit latch 222. It also receives the 8 least-significant bits from the 9-bit reference counter 220. When the CE* transitions to true, the comparator 226 compares its two sets of inputs. If all bits agree, it outputs a latch signal to a 1-bit latch 228 which thereupon latches the most significant bit $R_8$ then being output by the 9-bit reference counter 220. The output of the 1-bit latch is the drive signal $v_A$, which is a square wave signal with 50% duty cycle but starting with a delay relative to the $R_8$ bit signal (equivalent to the common node voltage $V_C$) determined by duty cycle stored for that cell.

Figure 8:
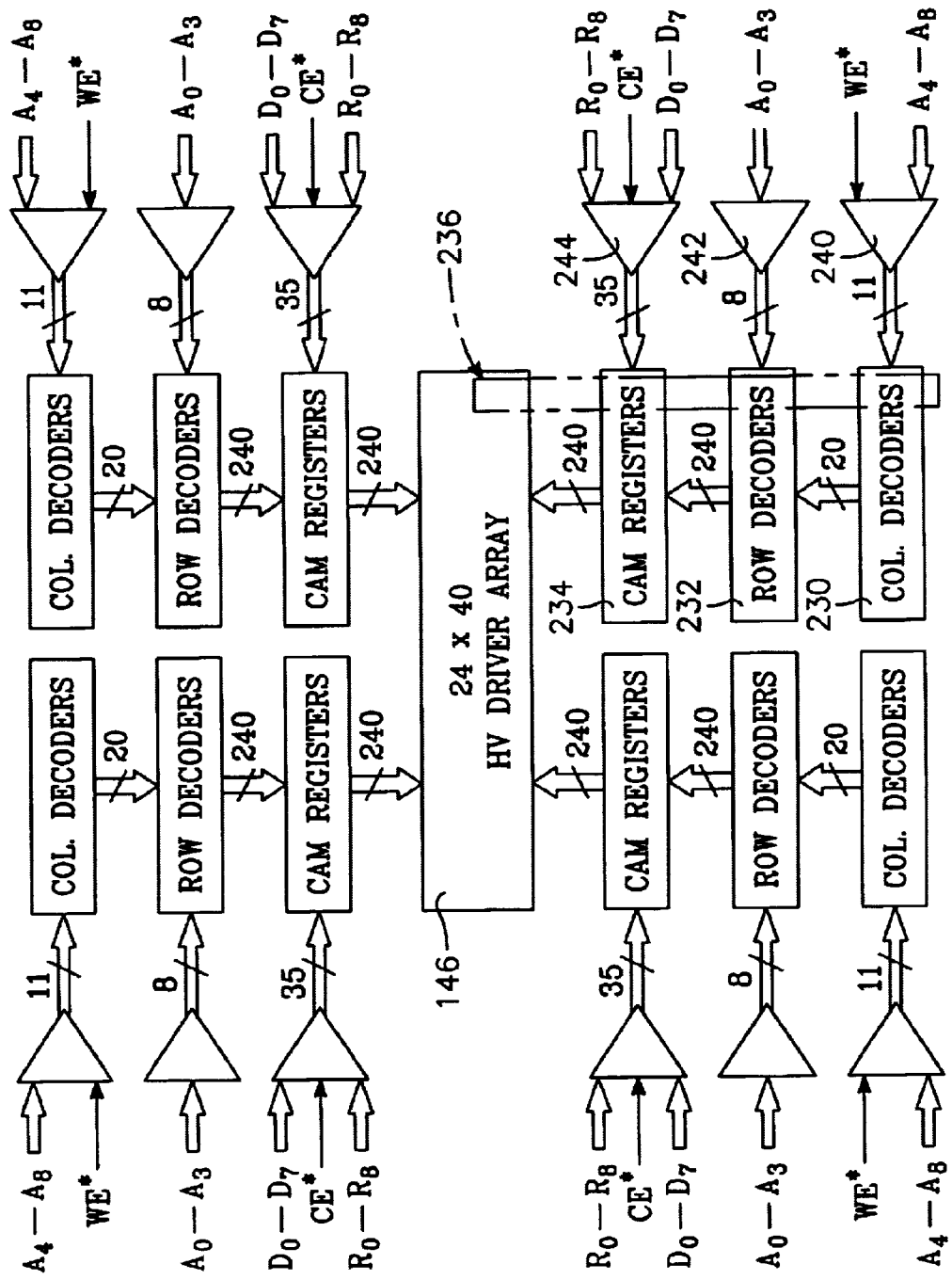
FIG. 8 is a floor plan of a mixed high-voltage and low-voltage integrated circuit driving 480 two-axis mirrors.
Figure 9:
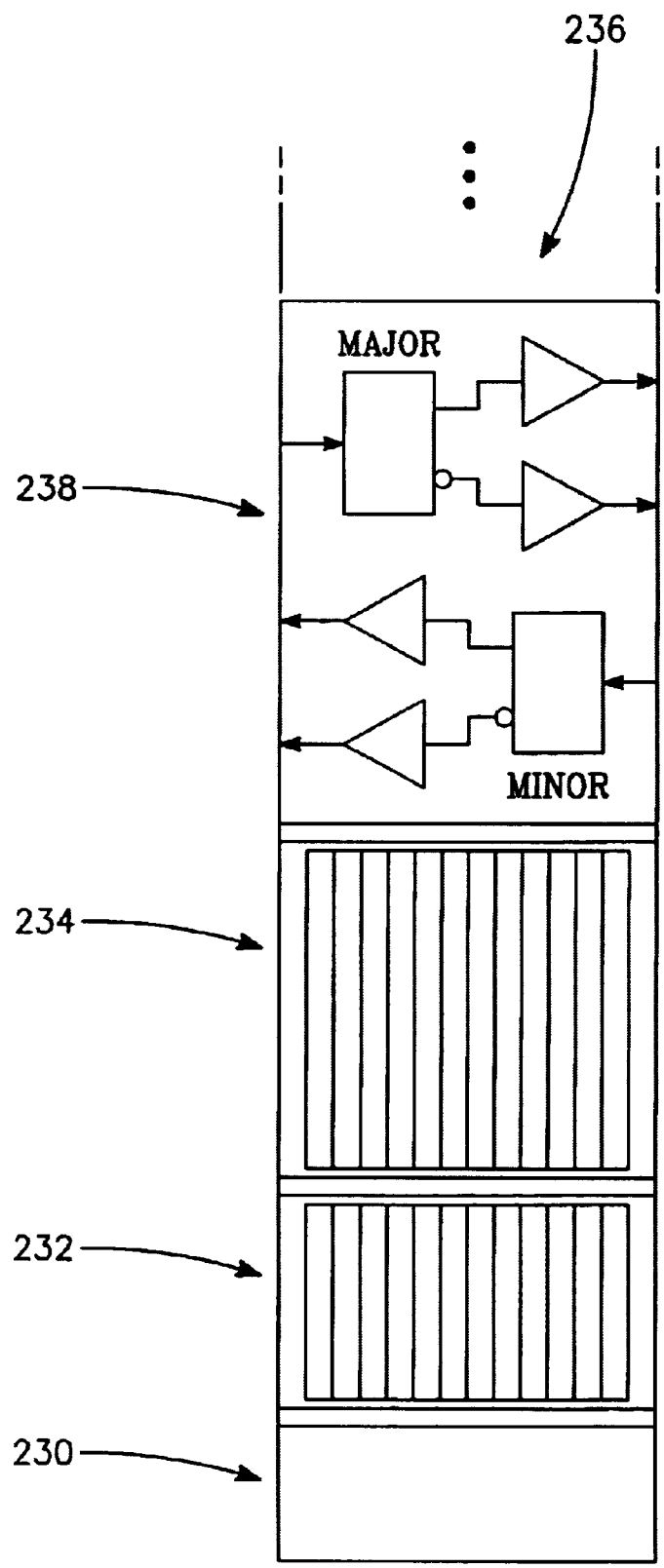
FIG. 9 is a floor plan of one logic column of the integrated circuit of FIG. 8.

An example of the physical layout of the combined high-voltage and low-voltage chip is illustrated in plan view in FIG. 8. The 24×40 driver array 146, used for two-axis control of a 12×40 mirror array, is divided into four array quadrants, each having 20 columns of drivers, vertically extending in the illustration, and 12 rows of drivers. Positioned on opposed sides of the driver array 146 is control circuitry similarly divided into four quadrants. Each quadrant contains a row 230 of column decoders, a row 232 of row decoders, and a row 234 of content addressable memory (CAM) registers. A CAM register, which will be described in much detail later, acts as a multi-bit comparator with written and stored values serving as two sets of inputs to the comparator. The circuitry within these rows 230, 232, 234 is replicated in logic columns 236, further illustrated in the plan view of FIG. 9, controlling six pairs 238 of high-voltage driver cells for the major and minor axis control of the mirrors. Only one column decoder is required for the high-order address of each logic column 236, but 12 row decoders and 12 CAM registers are required for all the 12 actuator cells controlled by the logic column 236.

Returning to FIG. 8, separate control buffering is provided in each quadrant. A buffer amplifier 240 receives from the microprocessor the five bits of column addresses $A_4$–$A_8$ and the complemented write enable signal WE* and supplies over 11 control lines to the row 230 of column decoders the true write enable signal and true and complemented versions of the column address bits. Another buffer amplifier 242 receives the four bits of row addresses $A_0$–$A_3$ and supplies true and complemented versions to the row 232 of row decoders over 8 control lines. The column decoders 230 deliver separate column write enable signals to the row decoders 232 over 20 control lines. A buffer amplifier 244 receives complemented compare enable signal CE*, the eight bits of position data $D_0$–$D_7$, the nine bits of reference counter output $R_{0-R8}$ and supplies 35 lines of true and complemented control signals to the CAM registers 234. These control signals correspond to the true compare enable signal and true and complemented versions of the position data and counter bits but some logical conditioning to be described later, is performed to satisfy some requirements of the CAM circuitry. The row decoder row 232 supplies 240 row/column write enable signals to the 240 CAM resisters associated with the 240 microactuators in quadrant. The CAM register row 234 delivers 240 true and complemented low-voltage drive outputs $v_A$, $v_B$ to the respective 120 actuator cells of the quadrant of the driver array 146.

As illustrated, the low-voltage sections may be placed on the sides of the high-voltage driver array 146. This has the advantage of mostly separating the high- and low-voltage circuitry. However, since both high-voltage and low-voltage circuitry can be fabricated with the same process, it is preferable though difficult to merge the high- and low-voltage circuitry on the ASIC chip to underlie corresponding cells of the actuator array.

Figure 10:
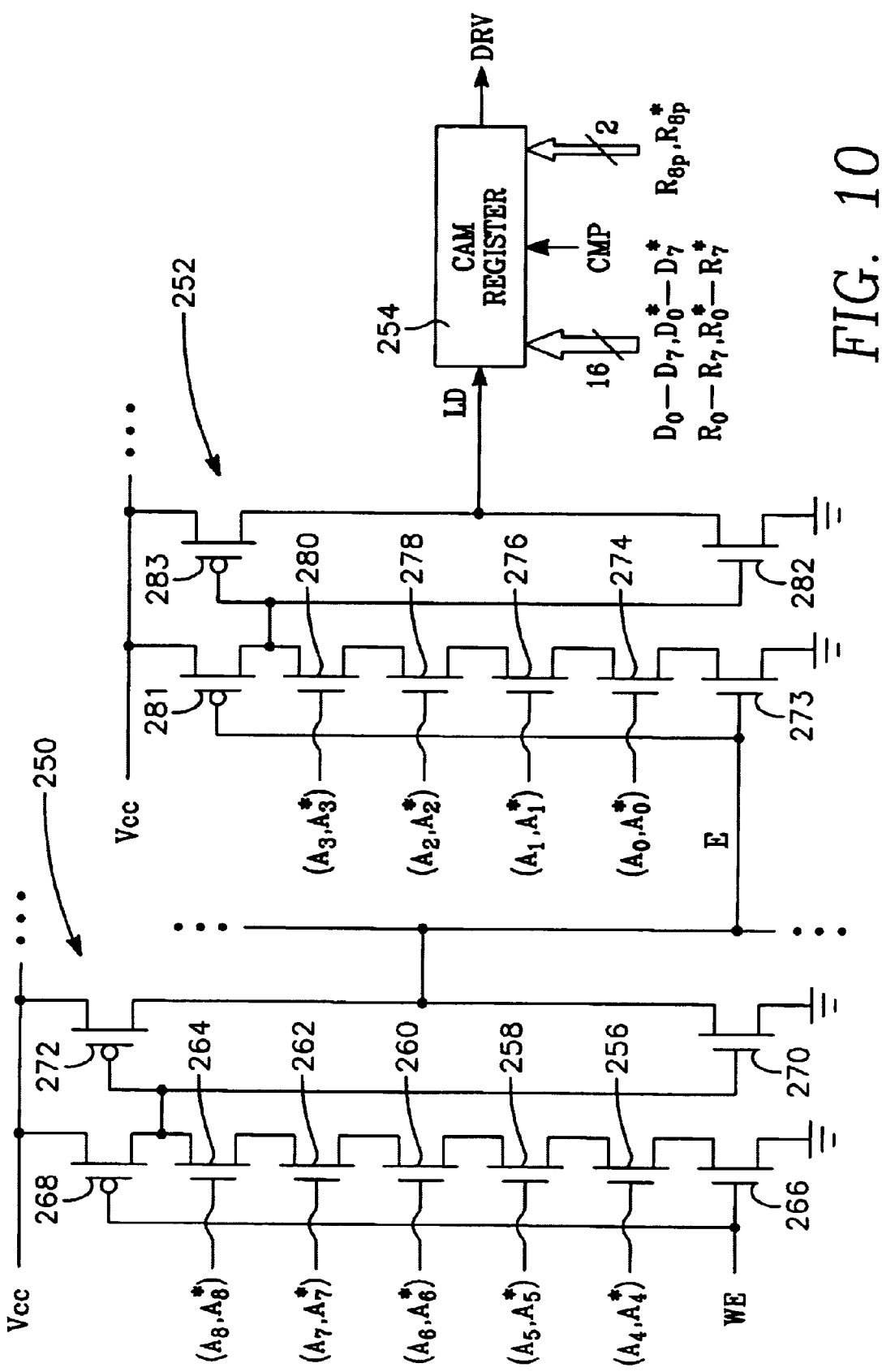
FIG. 10 is a schematic diagram of the address decoders controlling the CAM register.

As illustrated in the circuit diagram of FIG. 10, a column decoder 250 and a row decoder 252 enable an 8-bit CAM register 254 that is associated with each actuator. Each CAM register 254 requires its own row decoder 252 but a single column decoder 250 receiving the higher-order address bits may drive multiple row decoders 252. In the described architecture, one column decoder 250 drives 12 row decoders 252.

The column decoder 250 is a 5-input dynamic AND gate including five serially connected transistors 256, 258, 260, 262, 264, whose gates received appropriate true and complemented five-bit column address signals $A_4$–$A_8$, $A_4^*$–$A_8^*$. The appropriate polarity of the bits of the address signal is determined by the value of the column address associated with this column decoder 250 and is programmed into the inputs of the transistors 256–264 during manufacture by selective metallization between the true and complemented address lines and the transistor inputs. The five-transistor series has two additional transistors 266, 268 serially connected on its ends between the low-voltage power supply $V_{CC}$ (for example, 5V) and ground. The two end transistors 266, 268 are complementarily controlled by the true write enable signal WE. The point above the five address transistors 256–264 drives push-pull transistors 270, 272.

The output of the column push-pull transistors 270, 272 drives the enable input E of 12 row decoders 252, only one of which is illustrated. Each row decoder 252 is a four-input AND gate having transistors 273, 274, 276, 278, 280, 281 arranged in the same configuration as the transistors of the column decoder 250. The gates of the address transistors 274, 276, 278, 280 receive appropriate true and complemented four-bit row address signals $A_0$–$A_3$, $A_0^*$–$A_3^*$. Again, the polarity is preprogrammed according to the row value of the particular row decoder 252. The described dynamic logic is often referred to as domino CMOS because the outputs of both dynamic AND gates are normally low, but given the correct logical inputs can transition from low to high in a cascading fashion, similar to the toppling of dominos.

The output of row push-pull transistors 282, 283 is connected to the load input LD of the 8-bit CAM register 254 acting as the programmed 8-bit comparator. The load signal enables writing of position data into the CAM register 254 from parallel connected data lines $D_0$–$D_7$, $D_0^*$–$D_7^*$. When a compare input CMP is valid, the CAM register compares its stored position data with reference counter data $R_0$–$R_7$, $R_0^*$–$R_7^*$. When the comparison is correct, the CAM register 254 outputs a low-voltage drive signal DRV according to the polarity signals $R_{8P}$, $R_{8P}^*$. The DRV signal closely corresponds to the low-voltage drive signal $v_A$ supplied to the high-voltage drive circuit. These various input signals to the CAM register 254 are carried on signal lines that are connected in parallel to a number of CAM registers arranged across the CAM register row 234. The seeming redundancy of true and complemented input signals simplifies the CAM circuitry.

Figure 11:
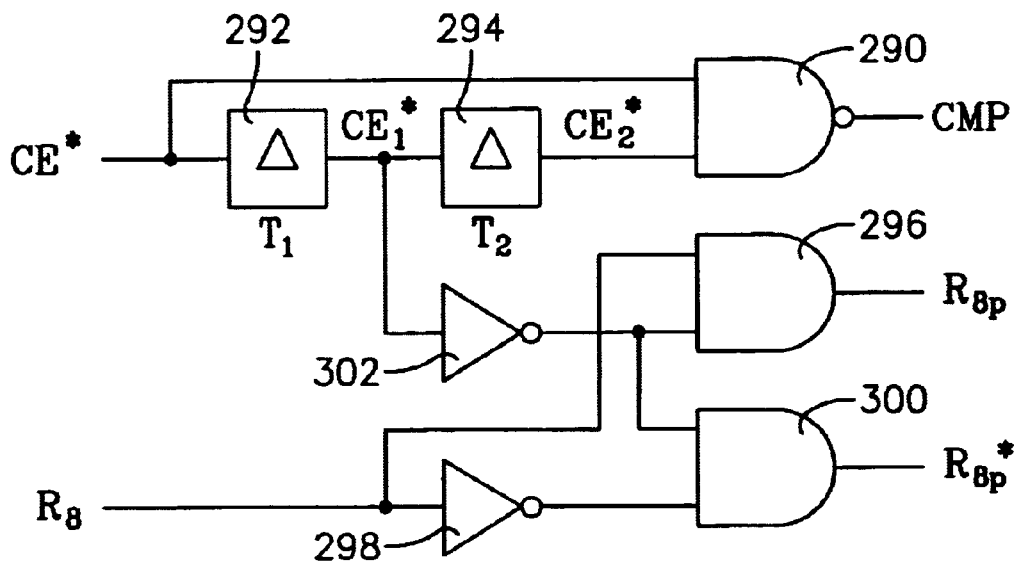
FIG. 11 is a circuit diagram of circuitry used to groom control signals used to control the CAM register.
Figure 12:
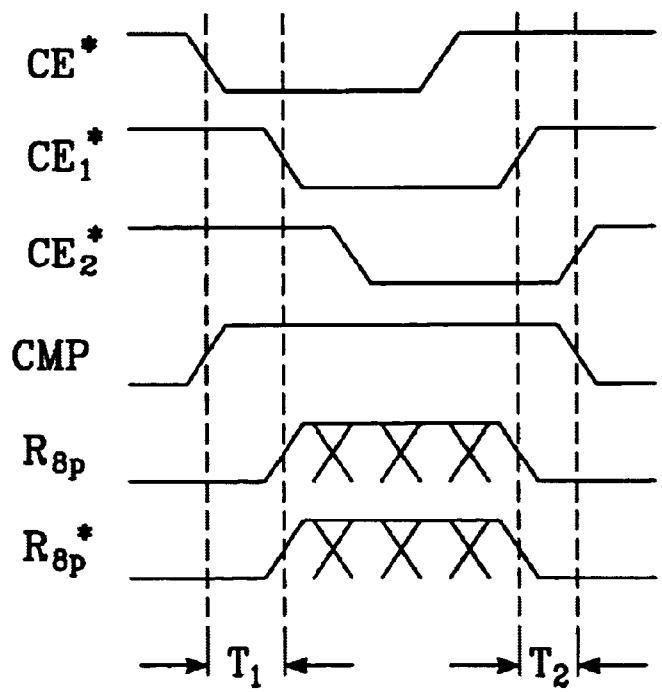
FIG. 12 is a timing diagram of signals in the grooming circuit of FIG. 11.

The CAM register buffer amplifier 244 of FIG. 8 contains timing logic illustrated in the block diagram of FIG. 11 to effect the timing diagram of FIG. 12. The circuitry effects the signal conversion from $CE^*$, $R_8$ to CMP, $R_{8P}$, $R_{8P}^*$. The delays introduced by the circuitry are needed for the compare operations of the CAM registers to be shortly described in detail The complemented compare enable signal $CE^*$ is delivered directly to one input of a compare NAND gate 290 and is delivered to the other input after two delay circuits 292, 294 delay it by two delay times $T_1$ and $T_2$ producing respective signals $CE_1^*$ and $CE_2^*$. The NAND gate 290 outputs a true compare signal CMP which has a leading edge coincident with the leading edge of the compare enable signal $CE^*$ and a trailing edge delayed by $T_1+T_2$ from that of $CE^*$. The high-order bit $R_8$ from the reference counter 220 of FIG. 7, which represents the polarity of the bipolar microactuator drive signal, is delivered directly to one input of a first AND gate 296 and in complemented form through an inverter 298 to a second AND gate 300. Air inverter 302 delivers to the other two inputs of the AND gates 296, 300 a true version of the compare enable signal but delayed by $T_1$. The two AND gates 296 output tree and complemented versions $R_{8P}$ and $R_{8P}^*$ of the high-order bit $R_8$ but with delayed initiation from the beginning of the compare signal CMP and with advance turnoff relative to the end of the compare signal CMP. It is assumed that compare enable signal $CE^*$ is transitioned to a valid state much less frequently than the high-order bit $R_8$ transitions at 50 kHz. Once the delays of FIG. 12 have been accounted for, transitions of $R_8$ are immediately translated to transitions of $R_{8P}$ and $R_{8P}^*$. Furthermore, the circuitry a valid $R_{8P}$ or $R_{8P}^*$ in the absence of a valid compare signal CMP.

Figure 13:
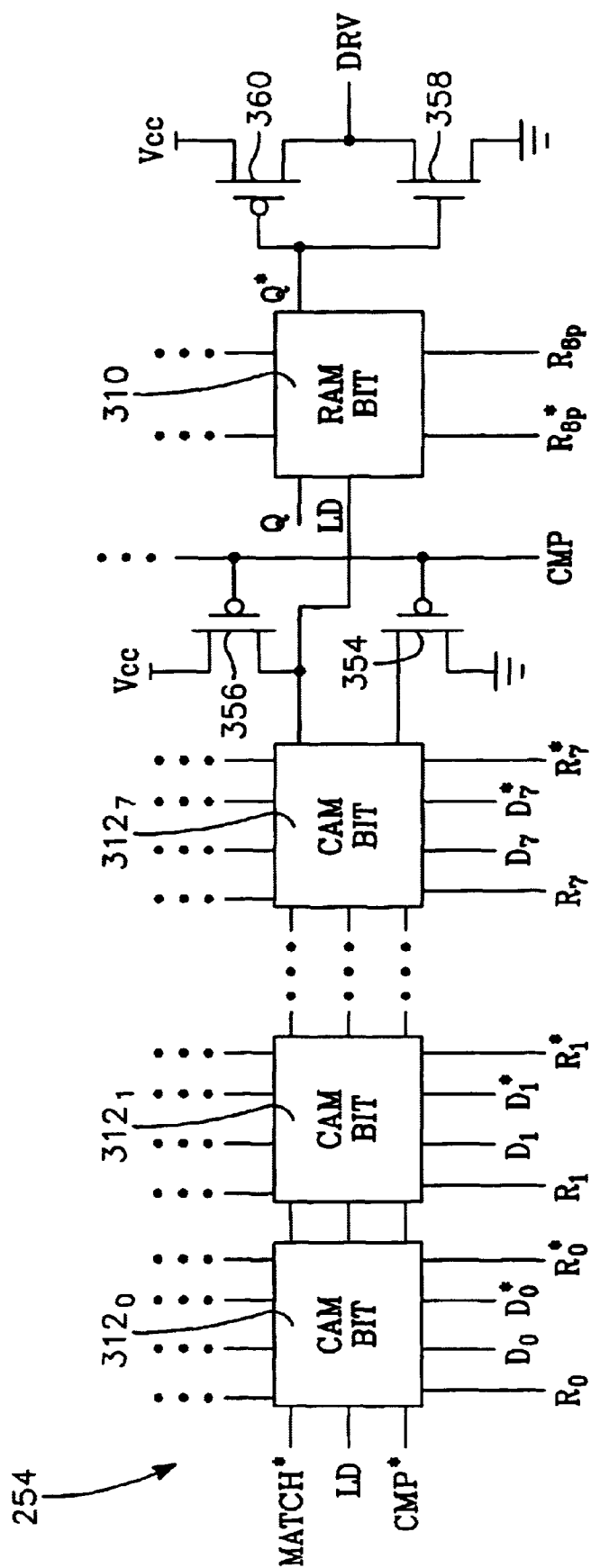
FIG. 13 is a circuit diagram of the CAM register.
Figure 14:
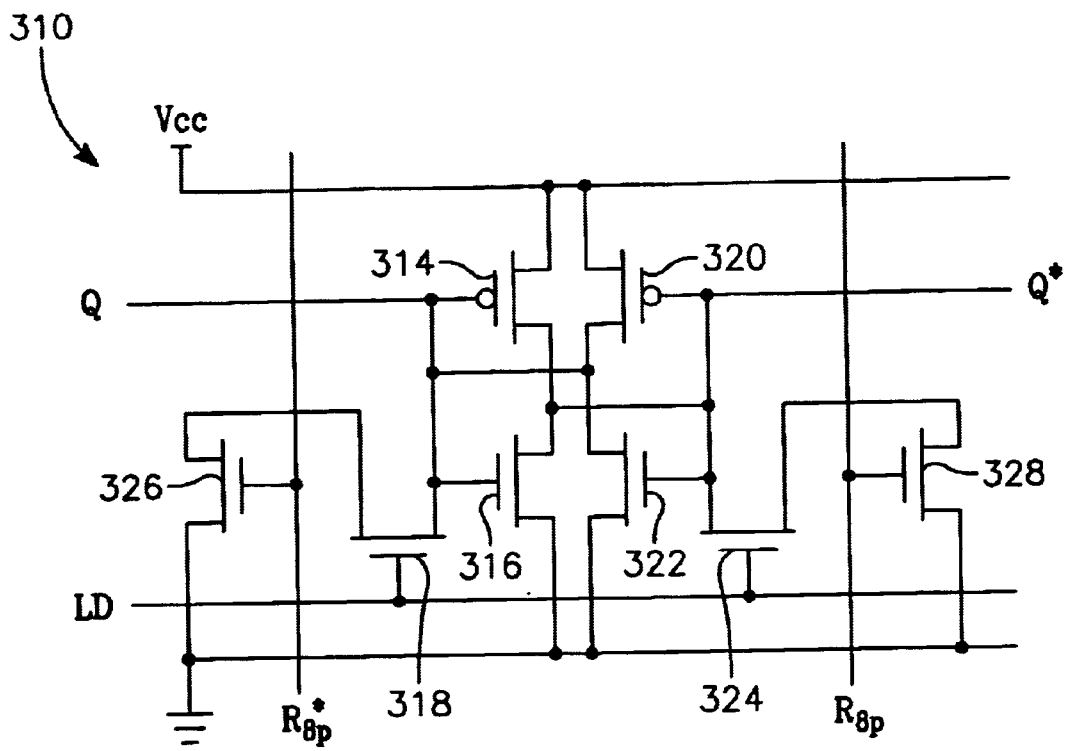
FIGS. 14 and 15 are schematic diagrams respectively of the RAM bit cell and the CAM bit cell in the CAM register of FIG. 13.

The circuitry for the CAM register will now be described in detail. Each CAM register 254 illustrated in the circuit diagram of FIG. 13 includes one RAM bit 310 and eight CAM bits $312_0$ through $312_7$ as well as other drive transistors. The RAM bit 310, as illustrated in the detailed schematic of FIG. 14 is based on a 6-transistor static RAM cell having transistors 314, 316, 318, 320, 322, 324 configured as a cross-coupled latch circuit between the low-voltage power supply $V_{CC}$ and ground to latch a polarity signal and to output complementary latched signals Q, $Q^*$. It additionally includes isolation transistors 326, 328 gated by the complementary delayed polarity signals $R_{8P}$, $R_{8P}^*$ to be latched and positioned to provide isolation between cells since the signals $R_{8P}$, $R_{8P}^*$ are supplied in parallel to all the CAM registers in the quadrant. When the load signal LD from the address decoder 250, 252 of FIG. 10 is asserted high, the complementary delayed polarity inputs $R_{8P}$, $R_{8P}^*$ are written into gates of the transistors 316, 322. In contrast to the traditional 6-transistor static RAM cell, the circuit functions properly even if the load signal LD is asserted simultaneously for multiple RAM bits 312 connected in parallel to signals $R_{8P}$, $R_{8P}^*$. When the load signal LD is negated, the polarity signal $R_{8P}$, $R_{8P}^*$ is statically held on the cross-coupled latch.

Figure 15:
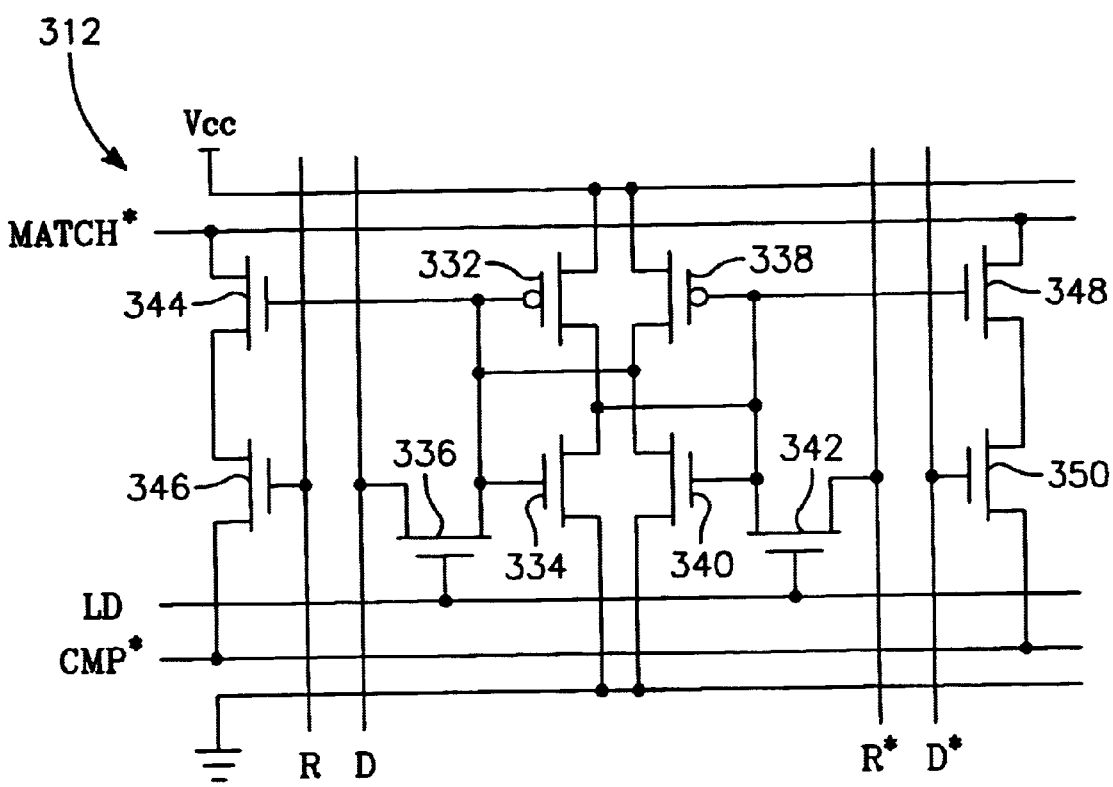

Each CAM bit 312, as illustrated in the detailed schematic of FIG. 15, includes a similar six-cell cross-coupled latch circuit including transistors 332, 334, 336, 338, 340, 342 latching complementary data bits D, $D^*$ representing the PWM pulse width. Data are written by setting the data bits D, $D^*$ to the desired values and asserting a high load signal LD. No isolation is required because only one of the parallel connected CAM bits 312 will be written at any time. The CAM bit 312 also includes a first pair of transistors 344, 346 and a second pair of transistors 348, 350, each pair serially connected between a complemented match line MATCH* and the complemented compare line CMP* to perform the exclusive-OR comparison between the respective bits of the latched data signals D, $D^*$ and the complementary reference counter signals R, $R^*$. The latched position data and the corresponding reference counter signals R, $R^*$ are stored in complementary form to facilitate the detection of a logical match that indicates disagreement between the reference counter and the stored data. A compare cycle is executed by setting the desired reference counter values R, $R^*$ and asserting the true compare signal CMP to a high logic level (CMP* is low). If the reference counter values R, $R^*$ match the stored values of D, $D^*$, one or the other of the serially connected pair of the transistors 344–350 of the exclusive-OR gate is turned on, and the complemented match line MATCH* is pulled shorted and low. Which transistor pair is turned on depends on the value of the matching bits. Only one matching bit among the eight parallel connected CAM bits 312 is required to short the complemented match line MATCH*. It is understood that the described exclusive-OR circuits compare true and complementary versions of the two signals. A circuit comparing two true versions of the signal with the same functional output of the multiple bits will also be considered an exclusive-OR circuit. The exclusive-OR circuit operes as a 1-bit comparator circuit between corresponding bits of the counter and store data R, D.

Returning to FIG. 13, The load signal LD from the address decoders is similarly supplied to all the CAM bits $312_0$–$312_7$ of the particular CAM register identified by the address decoder. The eight CAM bits $312_0$–$312_7$ are supplied with respective ones of eight complementary position (pulse width) data signals $D_0$–$D_7$, $D_0^*$–$D_7^*$ and the eight least significant complementary reference counter bits $R_0$–$R_7$, $R_0^*$–$R_7^*$. These signals are supplied in parallel to all the corresponding CAM bits of the different logic columns. An NMOS transistor 354 provides a pull-down signal CMP* and supplies it to all the CAM bits $312_0$–$312_7$. The true compare signal CMP is normally low, causing a PMOS transistor 356 to pre-charge the dynamically floating MATCH* line to a high logic level, that is, unmatched. A compare cycle is initiated by setting all the address register bits $R_0$–$R_7$, $R_0^*$–$R_7^*$ and asserting the true compare signal CMP to a high logic level. This activates the exclusive-OR circuits involving transistors 344, 346, 348, 350 in all the CAM bits. If any of the exclusive-OR circuits indicates a match (disagreement between position and counter bits), that is sufficient to bring the complemented match signal MATCH* low, indicating an overall mismatch or disagreement. On the other hand, if there is an 8-bit mismatch between the true reference counter signal $R_0$–$R_8$, and the latched complemented position data $D_0^*$–$D_7^*$ and necessarily vice versa, the complemented match signal MATCH* remains high indicating agreement between the reference counter and the stored position data. The circuitry providing precharging and discharging through any of the eight CAM bits 312 logically operates as an 8-input AND gate.

The complemented match signal MATCH* is also supplied to the load input LD of the RAM bit circuit 310, indicating that it should load and latch the respective delayed polarity signal $R_{8P}$, $R_{8P}^*$. The delay after assertion of the compare signal CMP, as discussed with reference to FIGS. 11 and 12, assures that the complemented match signal MATCH* has reached its correct logic level. The RAMbit complemented output Q* is connected to a CMOS driver including transistors 358, 360 producing the drive signal DRV, which is equivalent to the previously discussed $v_A$. The complemented drive signal $v_B$ can be produced by an inverter or by similar circuitry on the RAMbit true output Q.

Only one or the other of the complementary delayed polarity signals $R_{8P}$, $R_{8P}^*$ is pulsed high after the delay and thereby determines the state of the complemented RAMbit latched output Q*. If the complemented match signal MATCH* is low (at least one bit-match between reference counter and stored position), the previous latched state and drive signal DRV are not changed. If the complement match signal MATCH* is high (8-bit mismatch between reference counter and stored position), the latch output drive state is redetermined. If the true delayed polarity signal $R_{8P}$ is pulsed, the DRV output is set to a high state. If the complemented delayed polarity signal $R_{8P}^*$ is pulsed, the DRV output is set to a low state.

The operation of the CAM register includes a write operation for storing a position or pulse width value to be associated with the microactuator controlled by the CAM register. Once the position has been written, the reference counter cycles through its 256 values of its lowest eight bits, each value corresponding to one of 256 positions. When the reference counter matches the stored position value, CAM register output is latched to the current polarity set by the highest order bit of the reference counter. Since the drive signal DRV has a 50% duty cycle, the position value is a delay relative to the undelayed transition of the highest-order bit $R_8$, but since the high-voltage drive signal $V_A$ is determined by the difference between the drive signal DRV or $v_A$ and the highest-order bit $R_8$, the difference has a duty factor and mean square value determined by the delay introduced by the position value.

Although the CAM register is particularly advantageous for implementing the block diagram of FIG. 6, other implementations are possible. For example, a control logic utilizing commonly available logic circuits is illustrated in the block diagram of FIG. 16. A column enable signal CE propagates to all logic cells in the column direction, and a row enable signal RE propagates to all logic cells in the row direction. All cells receive a load signal LD, an n-bit data signal D, a common clock signal COMCLK at the frequency of the actuator signal, e.g., 50 kHZ, and a master clock signal MCLK, which is the product of the COMCLK signal and twice the resolution of the pulse width modulation, e.g., 25.6 MHz. The following circuitry is associated with each logic cell. Storing of the pulse width value is triggered by an AND gate 360 receiving on its input the load signal LD, the row enable signal RE, and the column enable signal CE. The output of the AND gate 360 is connected to the reset input of a n-bit register 362 causing it to latch the current n bits of data D indicating the desired pulse width.

For the bipolar pulsing, an edge detector 363 detects one edge of the common clock signal COMCLK and thereupon starts with a START signal an n-bit counter 364 counting the number of cycles in the master clock signal MCLK. When the count equals the pulse width value stored in the pulse width register 362, the counter outputs (and continues to output until its next start) a transition signal that is received on one input of an exclusive-OR gate 366. The other input of the exclusive-OR gate 366 is connected to the common clock signal COMCLK, which operates as a polarity signal. The true output of the exclusive-OR gate 366 is delivered in true form as the true drive signal $v_A$ and in inverted form through an inverter 368 as the inverted drive signal $v_B$. The true drive signal $v_A$ is a delayed version of the common clock signal COMCLK, where the amount of delay is determined by the contents of the pulse width register 362.

The explicit use of the common clock signal COMCLK can be eliminated by using an (n+1)-bit counter where the most significant bit can be used as the common clock signal.

The technology of the CAM registers implementing the low-voltage logic is considered separately inventive and may be applied to other applications, particularly those requiring a multi-channel digital-to-analog conversion in the control of large arrays of elements needing to be driven by individual voltage or current signals. Potential applications include print head drives, charge coupled device (CCD) array drives, phased array radar drivers, arrayed motion controllers, etc. The CAM-based circuitry is easily scalable to any array size requiring a limited number of control lines to the multiple control cells. Furthermore, placing a CAM register in each of many cells, which registers are continuously compared to a common external counter reduces the number of high-frequency nodes and lessens timing problems. The CAM design also lowers the number of transistors needed for the logic circuitry.

Figure 17:
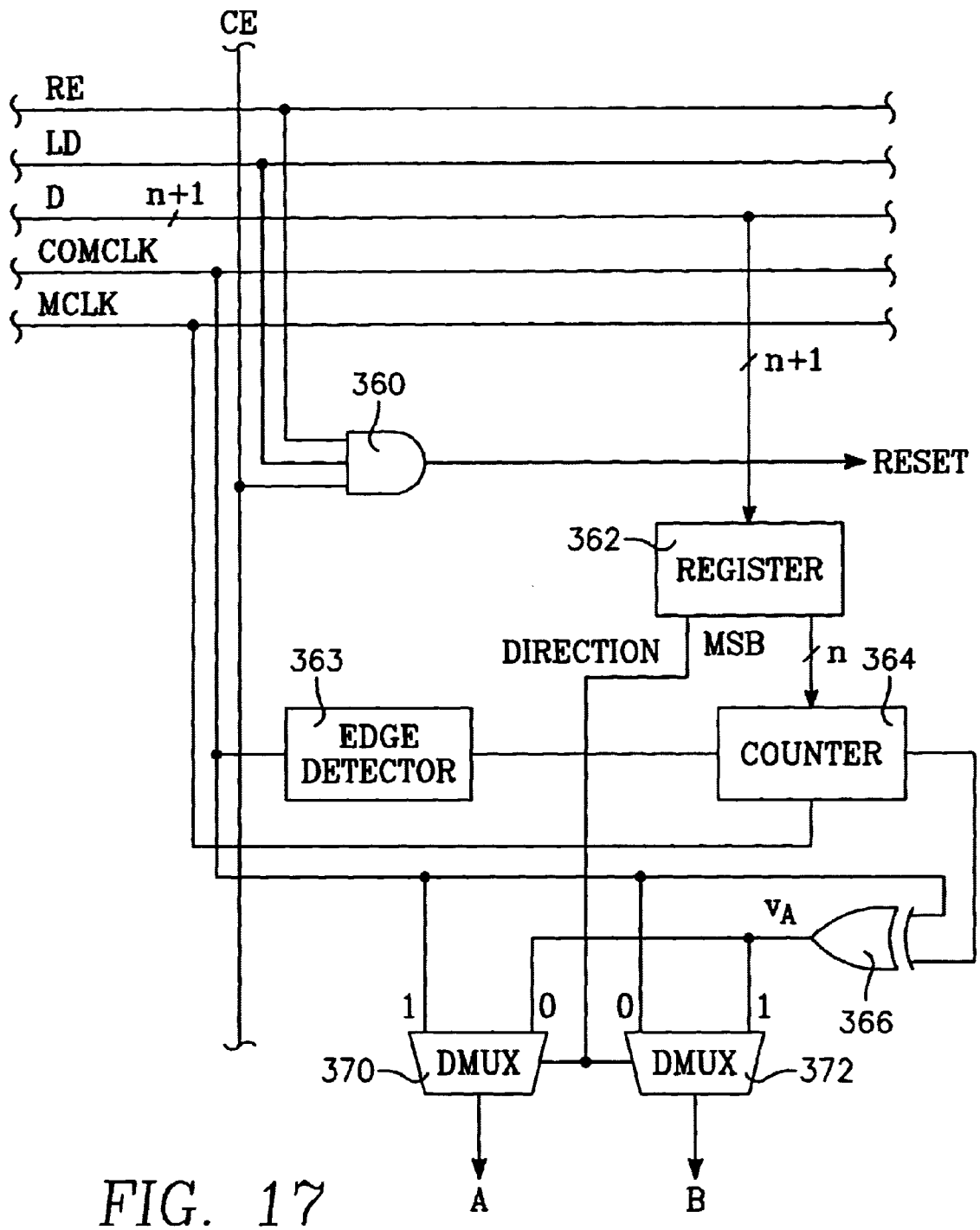
FIG. 17 is a block diagram of a modification of the circuitry of FIG. 16 usable when net force is applied to only one of two electrode pairs.

Another embodiment of the control logic illustrated in the block diagram of FIG. 17 is based on an alternative set of waveforms delivered to the actuator electrodes. A 1-bit control signal DIRECTION included as the high-order bit of the (n+1)-bit data signal D selects one of the electrodes to be driven by the drive signal $v_A$, which is the delayed version of the common clock signal COMCLK. The non-selected electrode is driven by the common clock signal COMCLK, resulting in no net force for the non-selected electrode. This arrangement may be preferred for very delicate actuators for which force on both sides of the see-saw tilting member may cause warping or other undesirable effects. The penalties for this variation include more circuitry, an additional control bit, and a less linear drive.

Figure 16:
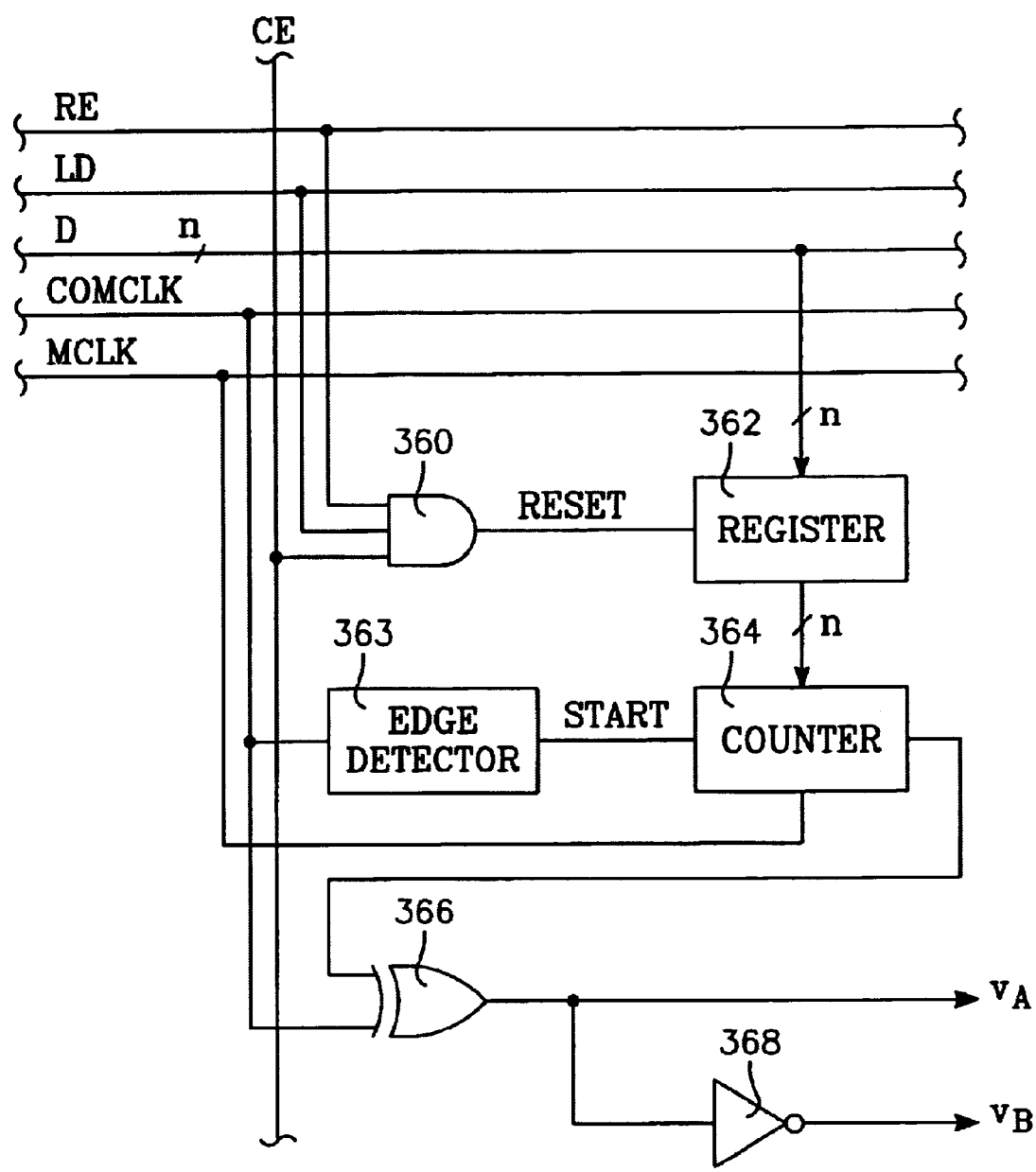
FIG. 16 is a block diagram illustrating alternative circuitry for implementing the logic drive circuit of FIG. 7.

The loading is performed by similar circuitry and signals as in FIG. 16 except that the register 362 stores both the DIRECTION signal and the n bits of pulse width data. The least significant n bits are delivered to the counter 364, and as described before, a true drive signal $v_A$ is delivered which is delayed version of the common clock signal COMCLK.

The direction bit DIRECTION stored as the most significant bit MSB in the register 362 is delivered to the selection inputs of two 1-bit demultiplexers 370, 372. The selection input determines whether demultiplexer outputs the 0 input or the 1 input. The demultiplexers 370, 372 receive on their 0 and 1 inputs the undelayed common clock signal COMCLK and the delayed drive signal $v_A$, but in a complementary arrangement between the 0 and 1 inputs. Thereby, the A and B electrodes are selected to receive alternately the delayed or the undelayed signals.

The design presented above for the CAM register as well as for other embodiments using a register to match a counter multi-bit output is based on a linear resolution in which the the number of control lines and the number of CAM bits are logarithmically related to the clock rate. However, non-linear counting designs are possible in which some of the control lines and CAM bits are eliminated. For example, the pulse width modulation may be performed with bands of count bits providing high-resolution and low-resolution bands within the pulse width. This could be accomplished by triggering the counter by a signal that is not locked to the master clock, that is, the counter output is not linear with time or the master clock, resulting in a counter output that is aperiodic on times less than the repetition period T, that is, the reciprocal of the drive frequency $f_{DR}$.

Although the invention has been described in the context of a two-dimensional array of mirrors intended for use in switching of wavelength-separated optical signals, a one-dimensional array, for example, used for switching white (not wavelength separated) light from one fiber to another.

The control system of the invention may be applied to other types of acuators, for example, an inductively driven tiltable mirror in which the electrodes are replaced by current coils.

The invention described above has many advantages.

The ternary high-voltage signal, created by differencing pairs of binary signals, allows a 200 VDC power supply and 200 VDC circuitry to produce 200V of RMS voltage. This effective actuation voltage is useful for many MEMS applications, and 200V digital CMOS circuitry is available. The use of higher voltage, particularly 40V and above, allows larger vertical gaps between the stationary and mirror electrodes. Therefore, a smaller portion of the gap needs to used in the switching. Using less than about 4/5 of the gap during operation avoids snap down. The larger vertical gaps also allows greater mirror tilt.

The pulse width modulation allows the control of the tilt or other acuator position to be implemented completely in digital circuitry, which is simpler and easier to implement than analog circuitry. Digital circuitry is less sensitive to noise and does not require hold capacitors, which occupy large areas of the integrated circuit die because of the large capacitances required. Digital circuitry does not require resistors as such. Digital circuitry require few if any amplifiers. The digital implementation of the high-voltage driver is compatible with low-voltage digital logic circuits needed for such advanced systems. Combined high-voltage and low-voltage CMOS fabrication processes are available, allowing integration of the logic and drivers on a single chip. Further, the smaller high-voltage digital circuitry allows it to be implemented on the same pitch as the actuators, thus enabling vertical orientation of the microactuators and their drivers.

Operation at a drive frequency well above the mechanical resonance of the MEMS structure, especially by a factor of at least ten, reduces ripple and ringing of the structure. Furthermore, such high-frequency operation reduces the importance of rise and fall times as long as they are relatively short compared to the pulse widths being used. The relaxed requirements for transition times ease the requirements on slew rates for the high-voltage drive transistors, thus allowing reduction of device and die sizes and reducing surge currents. The small driver sizes allows the associated micromirrors to be fabricated on a small pitch more consistent with the spacings imposed by the diffraction gratings needed for switching in wavelength-division multiplexing systems.

Splitting the high-voltage section from the low-voltage section with a minimum of electrical interconnects therebetween allows the high-voltage components to be placed under the actuators with a chip-on-chip bonded structure as described while the low-voltage components may be placed to the side of the actuator array. The low-voltage components may be fabricated on a separate integrated circuit from the high-voltage integrated circuit, both bonded to an MCM carrier board and interconnected by a limited number of wire bonds or solder bumps, only one or two being required for each actuator cell. The design requires a very small number of long switched high-voltage interconnects per cell, thus reducing the load capacitance and lowering the thermal load.

The use of paired electrodes on the two sides of the torsion beam driven by complementary PWM signals allows easy matching of the drive signals to the two sides, where one signal is delayed by $\tau$ and the other by $T-\tau$, relative to the common node signal. The simplified circuitry reduces the cell area, improves the linearity, and allows in some designs the use of a single high-voltage level shifter for each actuator cell.

Since a single common node signal is needed for the entire array, its driver may be located off the chip, thus reducing thermal dissipation in the integrated circuit.

What is claimed is:

1. A system including an array of electrically actuated mechanical elements, comprising:
   a plurality of electrically controlled actuators arranged in an array and each including at least a first mechanical element with an electrical connection thereto for driving a movement of said first mechanical element relative to a second mechanical element;
   a plurality of control circuits associated with respective ones of electrically controlled actuators and connected to respective ones of said electrical connections;
   wherein said plurality of control circuits comprise a low-voltage digital circuit section powered by a low-voltage power bus conveying a low voltage; and wherein each of said control circuits further comprises a high-voltage circuit section powered by a high-voltage power bus conveying a high voltage at least four times said low voltage; and wherein said plurality of actuators are implemented in one level of a bonded structure and wherein said high-voltage circuits are implemented in at least one first integrated circuit in a second level of said bonded structure, the corresponding actuators and high-voltage circuits being vertically aligned in said bonded structure.

2. The system of claim 1, wherein said low-voltage digital circuit section is implemented in at least one second integrated circuit offset to a side of an area of said high-voltage circuits.

3. The system of claim 1, low-voltage digital circuit section is at least partially implemented as a content addressable memory.

4. The system of claim 1, wherein said electrically controlled actuators are electrostatically controlled actuators each comprising first and second electrodes fixed respectively to said first and second mechanical elements.

5. The system of claim 4, wherein all said second electrodes are fixed to a common second mechanical element.

6. The system of claim 4, wherein said high-voltage circuits impose a variable width ternary pulse across said first and second electrodes.

7. An array of electrostatically tiltable plates, comprising:
a plurality of tiltable plates formed as a two-dimensional array having a pitch in a first layer of a bonded structure, said first layer comprising silicon and silicon oxide layers, each plate being twistably supported by and having approximately equal first and second areas separated by an axis of a torsion beam;
a second layer of said bonded structure including for each of said plates a first electrode and a second electrode in respective opposition to said first and second areas of said mirror plate, respective variable gap capacitors being formed between said first and second electrodes and said mirror plate;
a plurality of drive cells formed in a first integrated circuit fixed to said second layer and associated respectively with each of said plates, each of said drive cells supplying to its first electrode a respective high-voltage first drive signal and to its second electrode a respective high-voltage second drive signal, wherein each said drive cell is powered by a high-voltage bus supplying a high voltage and is arranged vertically below its corresponding plate in said bonded structure with said pitch; and a control section formed in a second integrated circuit fixed to said second layer and powered by a low-voltage bus supplying a low voltage no more than 25% of said high voltage.

8. The array of claim 7, wherein said second integrated circuit is disposed in parallel to said first integrated circuit in an area away from an area enclosing all said electrodes.

9. The array of claim 7, wherein said drive cells deliver complementary, variable-width, ternary pulses between respective ones of said first and second electrodes and said plates.

10. A multi-level MEMS system, comprising:
a first level including a two-dimensional array of a plurality of electrically controlled micro electromechanical system (MEMS) elements having associated electrical actuators;
a second level bonded to said first level including
at least one high-voltage integrated circuit having an array of drive sections disposed below respective ones of said MEMS elements, powered by a high-voltage power bus conveying a high voltage, and producing high-voltage drive signals for said associated electrical actuators, and
at least one low-voltage integrated circuit, powered by a low-voltage power bus conveying a low voltage, and producing respective low-voltage control signals independently controlling respective ones of said drive sections,
wherein said high voltage is at least four times said low voltage.

11. The system of claim 10, wherein said high voltage is at least eight times said low voltage.

12. The system of claim 10, wherein said at least one second integrated circuit is disposed to a side of said MEMS elements.

13. The system of claim 10, further comprising electrical interconnects between said at least one first integrated circuit and said at least one second integrated circuit.

14. The system of claim 13, wherein said electrical interconnects number no more than two for each of said drive sections.

15. The system of claim 10, wherein said electrical actuators are electrostatic actuators.

16. The system of claim 15, wherein each of said MEMS elements comprise a first electrode variably spaced from and second electrode and further comprising a high-voltage drive for all of said second electrodes.

17. The system of claim 10, wherein said MEMS elements comprise tiltable plates.

* * * * *